(12) United States Patent
Kitazoe et al.

(10) Patent No.: US 8,285,285 B2
(45) Date of Patent: Oct. 9, 2012

(54) INTRA-FREQUENCY CELL RESELECTION RESTRICTION IN WIRELESS COMMUNICATIONS

(75) Inventors: Masato Kitazoe, Hachiouji (JP); Rajat Prakash, La Jolla, CA (US); Nathan E. Tenny, Poway, CA (US); Gavin B. Horn, La Jolla, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 12/415,820

(22) Filed: Mar. 31, 2009

(65) Prior Publication Data

US 2010/0035615 A1    Feb. 11, 2010

Related U.S. Application Data

(60) Provisional application No. 61/087,534, filed on Aug. 8, 2008, provisional application No. 61/112,219, filed on Nov. 7, 2008.

(51) Int. Cl.
*H04W 36/00* (2009.01)
*H04W 4/00* (2009.01)

(52) U.S. Cl. ..... 455/436; 455/434; 455/458; 455/456.1; 455/410; 370/332; 370/328

(58) Field of Classification Search .......... 455/436, 455/434, 458, 456.1, 410; 370/332, 328
See application file for complete search history.

(56) References Cited

U.S. PATENT DOCUMENTS

| | | | |
|---|---|---|---|
| 2007/0111741 A1 | 5/2007 | Roberts | |
| 2008/0200146 A1* | 8/2008 | Wang et al. | 455/410 |
| 2008/0227453 A1* | 9/2008 | Somasundaram et al. | 455/436 |
| 2009/0104905 A1* | 4/2009 | DiGirolamo et al. | 455/434 |
| 2009/0238117 A1* | 9/2009 | Somasundaram et al. | 370/328 |
| 2009/0270103 A1* | 10/2009 | Pani et al. | 455/436 |

FOREIGN PATENT DOCUMENTS

EP    1320276 A2    6/2003

OTHER PUBLICATIONS

Universal Mobile Telecommunications System (UMTS); User Equipment (UE) procedures in idle mode and procedures for cell reselection in connected mode (3GPP TS 25-304 version 7.1.0 release 7), Dec. 1, 2006, paragragh 5.3.1.1.*
International Search Report and Written Opinion—PCT/US2009/040400—ISAEPO—Aug. 18, 2009.

* cited by examiner

*Primary Examiner* — Jinsong Hu
*Assistant Examiner* — Jean Chang
(74) *Attorney, Agent, or Firm* — François A. Pelaez

(57) ABSTRACT

Systems and methodologies are described that facilitate utilizing reselection indicators in reselecting access points in wireless communications. In particular, an indicator can be provided relating to a restricted association access point that specifies whether intra-frequency reselection is allowed. If so, a mobile device receiving the indicator can reselect to other access points, to which it has access, operating in a similar frequency. If not, the mobile device can evaluate access points in other frequencies so as not to cause substantial interference to the restricted association access point. In addition, a predicted level of interference caused by communicating with an intra-frequency access point can be computed and evaluated to override the reselection indicator, in some cases. Thus, a restricted association access point can control reselection for some devices to mitigate interference while allowing the devices to override prohibitive restricted access points.

102 Claims, 16 Drawing Sheets

INTRA-FREQUENCY CELL RESELECTION RESTRICTION IN WIRELESS COMMUNICATIONS

CLAIM OF PRIORITY UNDER 35 U.S.C. §119

The present Application for Patent claims priority to Provisional Application No. 61/087,534 entitled "INTRA-FREQUENCY CELL RESELECTION RESTRICTION IN CASE OF MACRO CELL MIXED CARRIER" filed Aug. 8, 2008, and assigned to the assignee hereof and hereby expressly incorporated by reference herein as well as Provisional Application No. 61/112,219 entitled "METHOD AND APPARATUS FOR SENDING AN INTRA-FREQUENCY RESELECTION OVERRIDE FOR IDLE MOBILITY" filed Nov. 7, 2008, and assigned to the assignee hereof and hereby expressly incorporated by reference herein.

BACKGROUND

1. Field

The following description relates generally to wireless communications, and more particularly to restricting intra-frequency cell reselection.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Mobile devices can travel throughout a wireless network reselecting various access points for communication to effectuate a seamless connection to the wireless network. In addition, neighboring access points of varying type can be deployed on common frequencies in the wireless network. For example, a mobile device communicating with a macrocell base station can reselect to a neighboring intra-frequency femtocell upon moving within range of the femtocell. In selecting an access point for reselection, the mobile device can measure surrounding intra-frequency access points and choose an access point with desirable communication parameters (e.g., signal strength, signal quality, etc.).

Some access points, however, can implement restricted association such that certain mobile devices are unable to connect to the access point. Where a mobile device determines that it cannot connect to a most desirable access point in reselection due to restricted association, it can evaluate a next most desirable access point until it encounters one to which it can connect. This, however, can cause interference over the restricted association access point since the mobile device can be located near the restricted association access point, communicating with the next most desirable access point. In extreme cases, where interference from the mobile device is strong, this can inhibit other devices communicating with the restricted association access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating restricting intra-frequency reselection in wireless communications. For example, when analyzing or ranking access points for reselection from a current access point, a mobile device can evaluate an indicator to determine whether intra-frequency reselection is allowed by a restricted association access point (which can be the current access point and/or a disparate highly ranked access point, in one example). Where intra-frequency reselection is allowed, the mobile device can reselect to a highest ranked selectable access points. Where intra-frequency reselection is not allowed, the mobile device cannot reselect to access points that operate on the same frequency; this can be subject to additional considerations, however. For example, the mobile device can determine its projected interference in communicating with the highest ranked selectable access point and ignore intra-frequency reselection restriction specified by the current access point where the projected interference is below a threshold. In addition, evaluation of the restriction indicator can occur according to a timer to determine when the mobile device can reselect. Moreover, the indicator can be global and/or specific to the mobile device, in one example.

According to related aspects, a method is provided including receiving a reselection indicator related to a restricted association access point that specifies whether intra-frequency reselection is allowed. The method also includes receiving an offset related to predicting interference caused to the restricted association access point by communicating with a target access point that operates in a similar frequency region as the restricted association access point and determining whether to select the target access point that operates in a similar frequency region as the restricted association access point based on the reselection indicator and the offset.

Another aspect relates to a wireless communications apparatus. The wireless communications apparatus can include at least one processor configured to obtain a reselection indicator related to a restricted association access point that specifies whether intra-frequency access point reselection is allowed. The processor is further configured to receive an offset related to potential interference caused from communicating with a target access point that operates in a similar frequency region as the restricted association access point and determine whether to select the target access point based at least in part on the reselection indicator and the offset. The wireless communications apparatus also comprises a memory coupled to the at least one processor.

Yet another aspect relates to a wireless communications apparatus comprising means for receiving a reselection indicator related to a restricted association access point that specifies whether intra-frequency reselection is allowed and means for obtaining an offset related to communicating with a target access point. The wireless communications apparatus can additionally include means for determining whether to select the target access point based at least in part on the reselection indicator and the offset.

Still another aspect relates to a computer program product, which can have a computer-readable medium including code for causing at least one computer to receive a reselection indicator related to a restricted association access point that specifies whether intra-frequency reselection is allowed. The computer-readable medium can also comprise code for causing the at least one computer to receive an offset related to predicting interference caused to the restricted association access point by communicating with a target access point that operates in a similar frequency region as the restricted association access point. Moreover, the computer-readable medium includes code for causing the at least one computer to determine whether to select the target access point based on the reselection indicator and the offset.

Moreover, an additional aspect relates to an apparatus. The apparatus can include a reselection indicator receiving component that obtains a reselection indicator related to a restricted association access point that specifies whether intra-frequency reselection is allowed. The apparatus can further include an interference prediction component that receives an offset related to interference caused by communicating with a target access point that operates in a similar frequency range as the restricted association access point and an access point reselection component that determines whether to select a target access point based at least in part on the reselection indicator and the offset.

According to other aspects, a method is provided including communicating with an access point to facilitate accessing a wireless network and evaluating a reselection indicator related to a restricted association access point in the wireless network that specifies whether intra-frequency reselection is allowed. The method also includes analyzing disparate access points in a disparate frequency for reselection based at least in part on the reselection indicator.

Another aspect relates to a wireless communications apparatus. The wireless communications apparatus can include at least one processor configured to receive wireless network access from an access point and evaluate a reselection indicator related to a restricted association access point in the wireless network that specifies whether intra-frequency reselection is allowed. The processor is further configured to analyze disparate access points in a disparate frequency for reselection based at least in part on the reselection indicator. The wireless communications apparatus also comprises a memory coupled to the at least one processor.

Yet another aspect relates to a wireless communications apparatus comprising means for communicating with an access point to facilitate accessing a wireless network and means for receiving a reselection indicator related to a restricted association access point in the wireless network that specifies whether intra-frequency reselection is allowed. The wireless communications apparatus can additionally include means for analyzing disparate access points in a disparate frequency or technology for reselection based at least in part on the reselection indicator.

Still another aspect relates to a computer program product, which can have a computer-readable medium including code for causing at least one computer to communicate with an access point to facilitate accessing a wireless network. The computer-readable medium can also comprise code for causing the at least one computer to evaluate a reselection indicator related to a restricted association access point in the wireless network that specifies whether intra-frequency reselection is allowed and code for causing the at least one computer to analyze disparate access points in a disparate frequency for reselection based at least in part on the reselection indicator.

Moreover, an additional aspect relates to an apparatus. The apparatus can include a reselection indicator receiving component that receives a reselection indicator related to a restricted association access point in the wireless network that specifies whether intra-frequency reselection is allowed. The apparatus can further include an access point reselection component that evaluates disparate access points in a disparate frequency or technology for reselection from a current access point based at least in part on the reselection indicator.

According to other aspects, a method is provided including providing one or more sectors selectable by one or more mobile devices for receiving access to a wireless network. The method also includes transmitting a reselection indicator to one or more mobile devices in the one or more sectors that specifies whether intra-frequency reselection is allowed for disparate access points in the one or more sectors.

Another aspect relates to a wireless communications apparatus. The wireless communications apparatus can include at least one processor configured to implement one or more sectors selectable by one or more mobile devices for receiving access to a wireless network. The processor is further configured to provide a reselection indicator to one or more mobile devices in the one or more sectors that specifies whether intra-frequency reselection is allowed for disparate access points in the one or more sectors. The wireless communications apparatus also comprises a memory coupled to the at least one processor.

Yet another aspect relates to a wireless communications apparatus comprising means for communicating with one or more mobile devices in a provided sector to provide access to a wireless network. The wireless communications apparatus can additionally include means for transmitting a reselection indicator to the one or more mobile devices that specifies whether intra-frequency reselection is allowed for disparate access points in the one or more sectors.

Still another aspect relates to a computer program product, which can have a computer-readable medium including code for causing at least one computer to provide one or more sectors selectable by one or more mobile devices for receiving access to a wireless network. The computer-readable medium can also comprise code for causing the at least one computer to transmit a reselection indicator to one or more mobile devices in the one or more sectors that specifies whether intra-frequency reselection is allowed for disparate access points in the one or more sectors.

Moreover, an additional aspect relates to an apparatus. The apparatus can include a transmitter for communicating with one or more mobile devices in a provided sector to provide access to a wireless network. The apparatus can further include a reselection indicator component that provides a reselection indicator to the one or more mobile devices specifying whether intra-frequency reselection is allowed for disparate access points in the one or more sectors.

According to other aspects, a method is provided including providing one or more sectors selectable by one or more mobile devices for receiving access to a wireless network. The method also includes transmitting an offset to a mobile device relating to overriding a reselection indicator received from a restricted association access point that specifies whether intra-frequency reselection is allowed.

Another aspect relates to a wireless communications apparatus. The wireless communications apparatus can include at least one processor configured to implement one or more sectors selectable by one or more mobile devices for receiving access to a wireless network. The processor is further configured to provide an offset to a mobile device relating to overriding a reselection indicator received from a restricted association access point that specifies whether intra-frequency reselection is allowed. The wireless communications apparatus also comprises a memory coupled to the at least one processor.

Yet another aspect relates to a wireless communications apparatus comprising means for communicating with one or more mobile devices in a wireless network. The wireless communications apparatus can additionally include means for transmitting an offset to a mobile device relating to overriding a reselection indicator received from a restricted association access point that specifies whether intra-frequency reselection is allowed.

Still another aspect relates to a computer program product, which can have a computer-readable medium including code for causing at least one computer to provide one or more sectors selectable by one or more mobile devices for receiving access to a wireless network. The computer-readable medium can also comprise code for causing at least one computer to transmit an offset to a mobile device relating to overriding a reselection indicator received from a restricted association access point that specifies whether intra-frequency reselection is allowed.

Moreover, an additional aspect relates to an apparatus. The apparatus can include a transmitter for communicating with one or more mobile devices in a wireless network. The apparatus can further include an interference offset component that transmits an offset to a mobile device relating to overriding a reselection indicator received from a restricted association access point that specifies whether intra-frequency reselection is allowed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
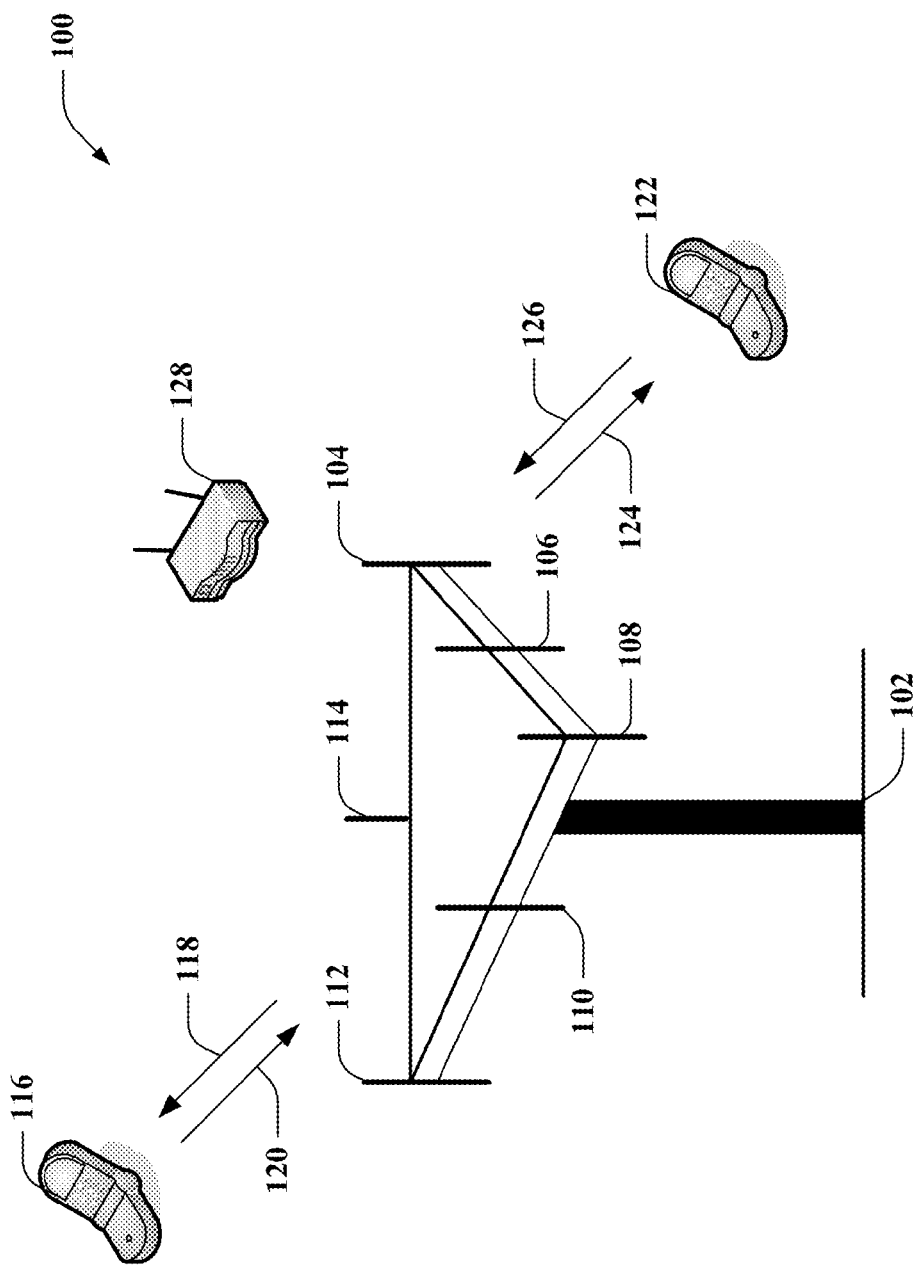
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 102 can communicate to the mobile devices 116 and 122 over the channels, which can be create for various types of data. For example, channels can be created for communicating various types of general communication data, control data (e.g., quality information for other channels, acknowledgement indicators for data received over channels, interference information, reference signals, etc.), and/or the like.

In one example, the base station 102 can be a macrocell base station, femtocell access point, picocell access point, relay node, and/or the like. Additionally, a smaller-scale access point 128 is provided, which can be a femtocell access point, picocell access point, relay node, and/or the like. In one example, the smaller-scale access point 128 can communicate with mobile devices using similar technology to that of the base station 102. For example, the smaller-scale access point 128 can define channels over radio communication as well and can communicate with mobile devices over a forward link while receiving communication over a reverse link. In one example, mobile devices 116 and/or 122 can travel around the base station 102 and reselect to the smaller-scale access point 128 when in-range. Mobile devices 116 and/or 122 can reselect access points by measuring surrounding access points to determine when one or more surrounding access points can provide a level of communication more desirable than a current access point (e.g., based on signal strength, services offered, etc.). After measuring, the mobile devices 116 and/or 122 can rank the access points to determine a most desirable access point; if that access point is other than the current, the mobile devices 116 and/or 122 can attempt reselection to the access point. In an example, however, the smaller-scale access point 128 can implement restricted association such that some mobile devices may not connect to the smaller-scale access point 128. In such cases, the mobile devices 116 and/or 122 can attempt to connect to a next-best access point if different from the current access point; in this example, if the mobile devices 116 and/or 122 cannot connect to smaller-scale access point 128 though it is the determined best access point, they continue communicating with the base station 102.

Communicating with a next-best access point, however, can in some cases cause substantial interference to the best access point when the next-best access point operates in the same frequency space, especially where the mobile devices are close proximity of the best access point. In this regard, the mobile devices 116 and/or 122 can receive a reselection indicator related to the smaller-scale access point 128 that specifies whether the mobile devices 116 and/or 122 can perform intra-frequency reselection (or continue to communicate for that matter) to the base station 102 and/or one or more disparate access points (not shown). As described herein, this can allow the smaller-scale access point 128 to mitigate potential interference from the mobile devices 116 and/or 122 caused by communicating with base station 102 or disparate access points in the same or similar frequency space.

It is to be appreciated that the mobile devices 116 and/or 122 can additionally verify the indicator where the smaller-scale access point 128 is a next-best access point and the base station 102 is the best access point. This can be the case where the base station 102 is a macrocell base station as such communication can have high power as compared to communication with a smaller-scale access point 128. The indicator can be general and/or specific to each mobile device 116 and/or 122. In addition, the indicator can be provided by the smaller-scale access point (e.g. during measurement for reselection), base station 102, a disparate access point, a core wireless network, inferred by the mobile device 116/122, and/or the like. For example, where the mobile devices 116 and/or 122 desire reselection, if the indicator is set to forbid reselection, the mobile devices 116 and/or 122 can set a timer to continually check the indicator related to the smaller-scale access point 128 for modification.

Once the indicator is set to allow reselection, the mobile devices 116 and/or 122 can select (e.g., reselect, camp on, etc.) one or more surrounding access points for receiving access to the wireless network (and/or continue to communicate with the one or more surrounding access points, such as base station 102 in this example). In the meantime, for example, the mobile devices 116 and/or 122 can have reselected an access point in a different frequency or of a different technology and can reselect to a highest ranked surrounding access point, to which connection is allowed, upon determining the indicator set to allow intra-frequency reselection. In another example, the mobile devices 116 and/or 122 can ignore the indicator where predicted or actual interference caused by the mobile devices 116 and/or 122 is below a threshold level. In this example, the mobile devices 116 and/or 122 can determine a predicted or actual level of interference for communicating with one or more of the surrounding access points. A threshold level can be set for the mobile device, and if the predicted or actual level is less than the threshold, the mobile device 116 and/or 122 can reselect to another access point and/or continue communicating with the access point.

It is to be appreciated that the predicted level can be access point specific, in one example. Though the mobile device 116 and/or 122 may be forbidden to perform intra-frequency reselection according to the above, it can still in some cases reselect access points that operate outside of the frequency, as those access points likely do not cause substantial interference to the smaller-scale access point 128. It is to be appreciated that similar functionality can be implemented for the base station 102 to control mobile device 116 and/or 122 communication with one or more surrounding access points (e.g., smaller-scale access point 128 or others).

Figure 2:
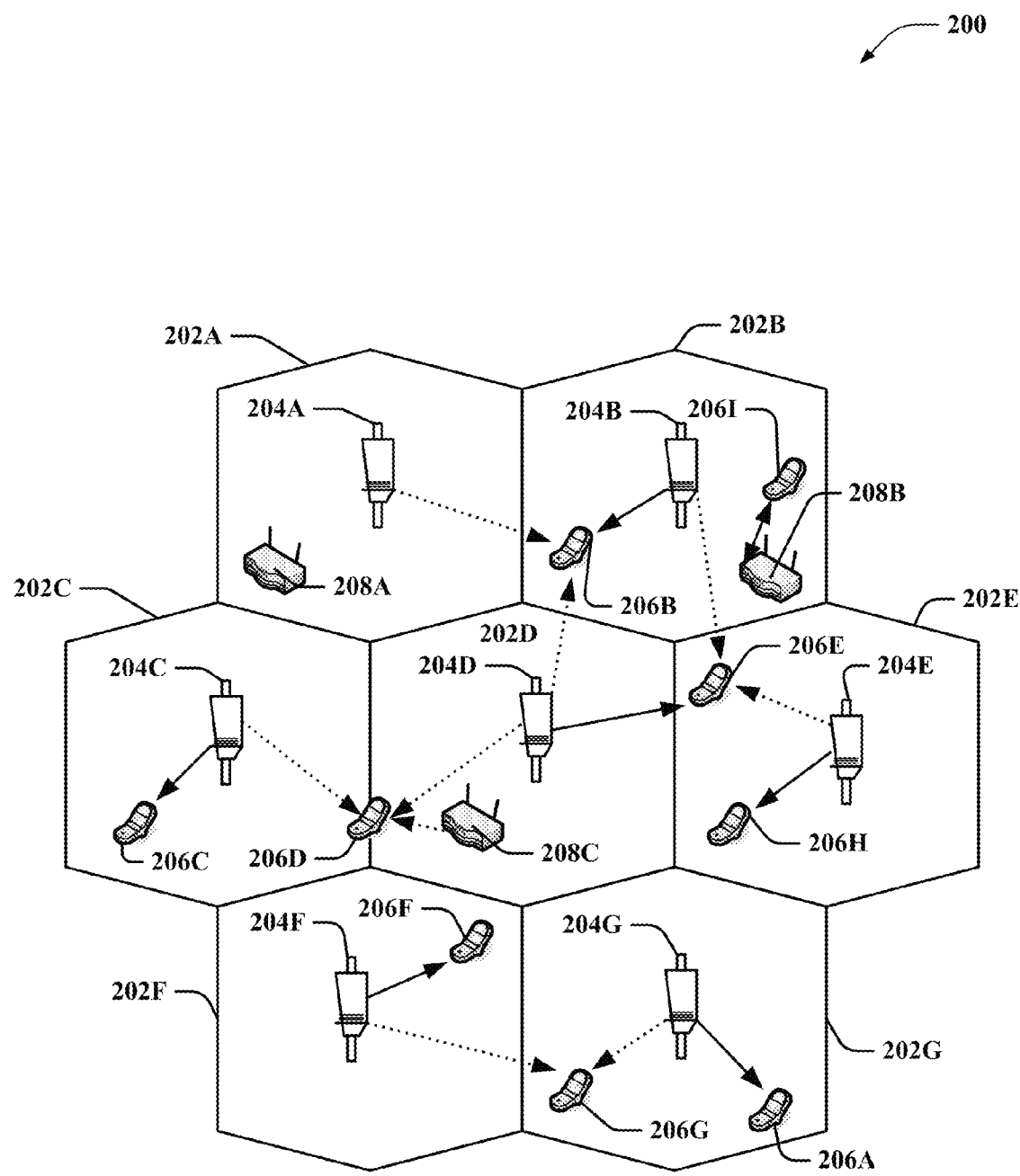
FIG. 2 is an illustration of a wireless communication network in accordance with aspects described herein.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocell access points, picocell access points, relay nodes, mobile base stations, and/or the like, offering services related to a particular service location, as described. The mobile devices 206A-206I can additionally or alternatively communicate with these smaller scale access points 208A-208C to receive offered services. The wireless communication system 200 can provide service over a large geographic region, in one example (e.g., macrocells 202A-202G can cover a few blocks in a neighborhood, and the smaller scale access points 208A - 208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. Reselection can include measuring surrounding access points (or related cells), ranking the access points based on the measurement, and attempting to handover communication to the highest ranked access point from a current access point. Reselection, in addition, can occur while a mobile device is in an idle or active mode. Thus, for example, mobile device 206D can be currently communicating with access point 204C while continually measuring surrounding access points for reselection (e.g., based on a timer). While measuring, access points 204D and/or 208C can become higher ranked than access point 204C as the mobile device 206D moves closer to the disparate access points. When this occurs, the mobile device 206D can reselect to the highest ranked access point.

In some cases, however, the mobile device 206D may not be able to connect to the highest ranked access point. In one example, access point 208C can be a restricted association access point, such that only certain mobile devices can connect. In this regard, access point 208C can provide a closed subscriber group (CSG) identifier. In an example, mobile devices can store lists of CSGs that they can and/or cannot access. If access point 208C implements restricted association, for example, and the mobile device 206D determines that it is not allowed to access the access point 208C, then the mobile device 206D can reselect to the next highest ranked selectable access point (e.g., or continue communicating with access point 204C where it is the next highest ranked). In one example, the mobile device 206D can measure only access points operating in a similar or same frequency as a current access point 204C or at least measure such access points before measuring out of frequency.

According to an example, mobile device 206D can receive an intra-frequency reselection indicator related to access point 208C. As described, the indicator can specify whether the mobile device 206D can communicate with intra-frequency access points to mitigate substantial interference to the access point 208C. The mobile device 206D can receive the indicator from the access point 208C (e.g., during measurement), from access point 204D, which specifies indicators for access points in the cell 202D, or it can be inferred from by the mobile device 206D, and/or the like. Where the indicator is set so as not to allow intra-frequency reselection or communication to one or more surrounding access points and the mobile device 206D is not allowed to connect to the access point 208C (e.g., due to restricted association), the mobile device 206D can measure access points out of frequency (not shown) to attempt reselection thereto. As described, the mobile device 206D need not be attempting reselection to receive the indicator and accordingly reselect out of frequency, but rather the mobile device 206D can be communicating with an access point that causes interference to the access point 208C. It is also possible that the indicator specifies that intra-frequency reselection is allowed, in which case the mobile device 206D can reselect to the highest ranked access point it can, or continue communication with access point 204C where it is the highest ranked selectable access point.

In one example, the mobile device 206D can recheck the indicator, or other parameters of the access point 208C, according to a timer. Where the indicator changes from not allowed to allowed, for example, the mobile device 206D can reselect to an intra-frequency access point. In addition, the mobile device 206D can override the indicator based on determining a predicted or actual amount of interference caused by communicating with the intra-frequency access point. For example, the mobile device 206D can predict an amount of interference based on one or more offset parameters, which can be signaled from an underlying network, specified by access point 204D for all access points in the cell 202D, and/or the like. This can protect the mobile device 206D from indicator abuse or malfunction by the access point 208C, for example.

In another example, the mobile device 206D can also determine a number of access points to measure, attempt connection to based on the indicators, and override the indicator before moving out of frequency or over to a different technology (e.g., 3GPP to GSM) for reselection. Moreover, as mentioned above, the mobile device 206D can receive the indicator for access point 208C and other access points in the cell 202D from the macrocell access point 204D. It is to be appreciated that the access point serving the indicator need not be a macrocell. The indicator can be generic to substantially all access points in the cell 202D. Thus, where the mobile device 206D receives the indicator from the access point 208C, it can assume that it cannot perform intra-frequency reselection at that point in time, which saves power on the mobile device 206D since it does not need to query other access points for respective indicators. In another example, however, the mobile device 206D can read the indicators from other access points, and resolution can be performed by the mobile device 206D where conflicting indicators are received (e.g., as coded in the mobile device 206D, received from the underlying network, and/or the like).

Figure 3:
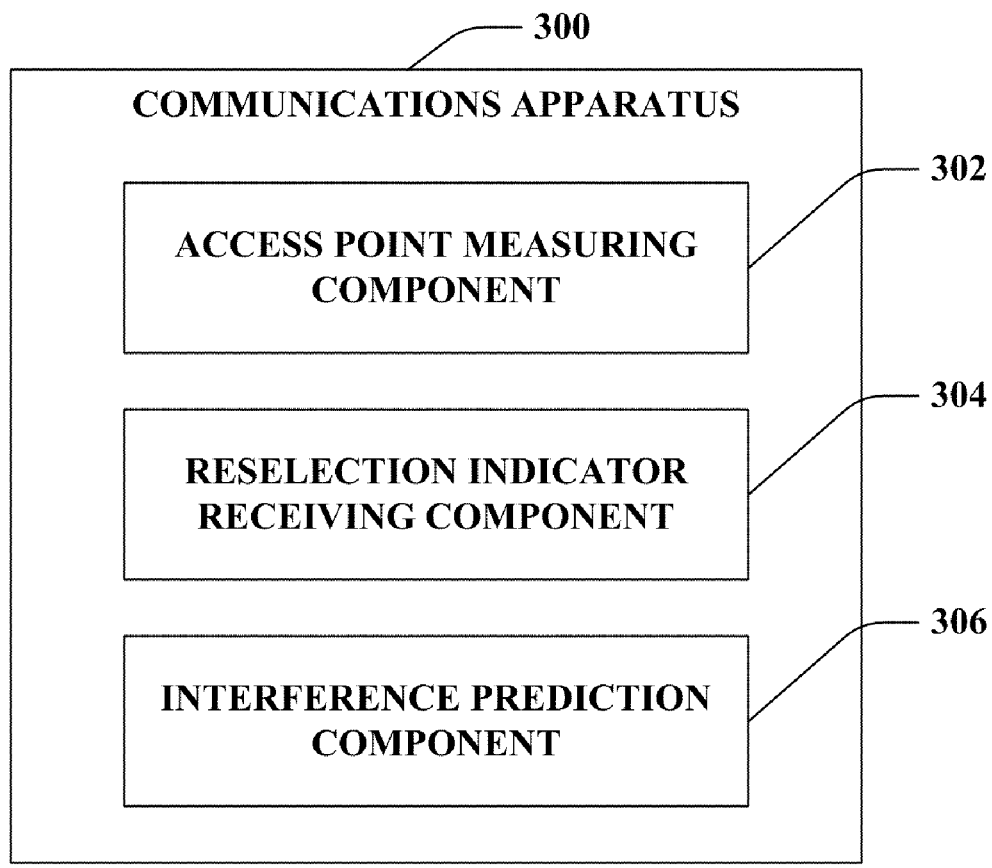
FIG. 3 is an illustration of an example communications apparatus for employment within a wireless communications environment.

Turning to FIG. 3, illustrated is a communications apparatus 300 for employment within a wireless communications environment. The communications apparatus 300 can be an access point or a portion thereof, or substantially any communications apparatus that communicates over and/or receives access to a wireless network. The communications apparatus 300 can include an access point measuring component 302 that evaluates surrounding access points for reselection, a reselection indicator receiving component 304 that obtains a reselection indicator related to an access point, and an interference prediction component 306 that calculates an interference level caused by communicating with a surrounding access point.

According to an example, the communications apparatus 300 can communicate with one or more access points in a wireless network (not shown). The communications apparatus 300 can communicate in an idle or active mode and can reselect access points as it moves throughout a wireless network coverage area. For example, the access point measuring component 302 can continually evaluate surrounding access points to determine one or more aspects thereof In one example, the access point measuring component 302 can determine signal strength of the access points, interference level, services offered, and/or the like, and can rank the access points based on one or more measurements. In a reselection process, for example, the communications apparatus 300 can initiate reselection to the highest ranked access point where it differs from the current access point.

In addition, some access points can be restricted association access points such that one or more devices cannot connect to the access points. The access point measuring component 302 can acquire CSG information for surrounding access points when measuring and can determine whether the CSG information is in a list of forbidden or allowed access points. Where the access point measuring component 302 determines that connection to the access point is forbidden, it can consider lower ranked access points for reselection. In addition, the reselection indicator receiving component 304 can obtain a reselection indicator related to one or more surrounding access points. The indicator can be received from the access point, another surrounding access point, a core wireless network component, a mobile device, and/or the like. In addition, the reselection indicator receiving component 304 can receive the indicator based on a request for the indicator, which can be caused by a timer, during access point measurement, during a reselection attempt, and/or the like.

As described, the indicator can be related to whether the communications apparatus 300 is allowed to reselect to one or more disparate access points in the same or similar frequency space. Where the indicator does not allow such reselection, the communications apparatus 300 can continue communicating with a current access point, in one example, and the reselection indicator receiving component 304 can continue to obtain the indicator determining whether it has been modified to allow intra-frequency reselection. If the indicator changes, the communications apparatus 300 can reselect to one or more intra-frequency access points. In another example, the communications apparatus 300, when communicating with an access point, can require the reselection indicator receiving component 304 to obtain indicators related to restricted association access points that may not be the highest ranked. If one or more of the restricted association access point indicators specifies that intra-frequency reselection is not allowed, the communications apparatus 300 can be required to reselect an access point in a different frequency or using a different technology, as described.

Forced reselection on disparate frequencies, however, can be subject to one or more additional inquiries. For instance, the interference prediction component 306 can estimate an interference level caused by the communications apparatus 300 communicating with a disparate access point. In an example, the interference prediction component 306 can compute the interference based at least in part on an offset, which can be received from an underlying network in one example. In this regard, the interference prediction component 306 can measure reference signal received power (RSRP) for a restricted association access point and the next highest ranked access point (e.g., or receive the RSRPs from the access point measuring component 302), for example. The mobile device 206D can use the following formula to determine whether to ignore the restricted association access point indicator:

$$RSRP\_csg < RSRP\_neighborcell + Offset\_neighborcell$$

where RSRP_csg is the RSRP of the restricted association access point, RSRP_neighborcell is the RSRP of a current access point or one being evaluated for reselection, and Offset_neighborcell is the offset parameter described above, which can relate to the current access point or one being evaluated for reselection. If the above formula is satisfied, for example, the communications apparatus 300 can reselect to the evaluated access point or continue communicating with a current access point though they share frequency range with the restricted association access point.

According to another example, the access point measuring component 302 can evaluate multiple access points for reselection where at least some of the access points are restricted association access points that have indicators not allowing intra-frequency reselection for the communications apparatus 300. In this example, however, the interference prediction component 306 can override one or more of the restricted association access points using the formula described above. The interference prediction component 306 can set a limit, for example, for a number of consecutive overrides before the access point measuring component 302 measures access points on a different frequency and/or technology. For example, where the best ranked access point is a restricted association access point inaccessible by the communications apparatus 300 and its indicator is set at allowed or can be overridden, the access point measuring component 302 can evaluate a next best ranked access point and so on until it reaches an access point to which it can connect. If the access point measuring component 302 evaluates the access points ranked higher than a N-best access point, and all are restricted association access points having allowed indicators or overridden indicators (as determined by the reselection indicator receiving component 304 and/or interference prediction component 306, as described), the access point measuring component 302 can begin evaluating access points on a disparate frequency and/or technology. N can be a positive integer, for example. In addition, the iterative evaluations in a given frequency can additionally or alternatively be time-based, and/or the like.

Figure 4:
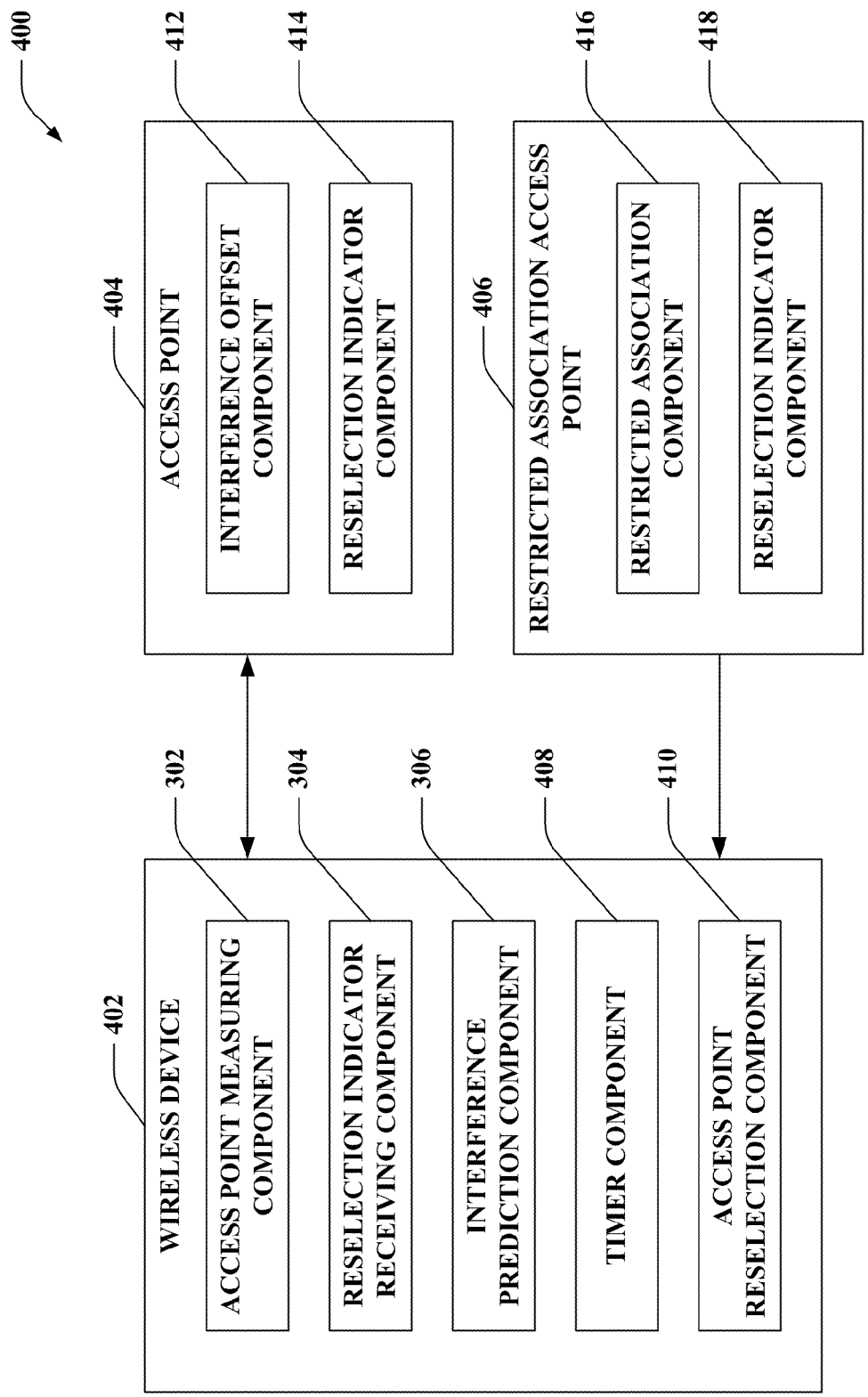
FIG. 4 is an illustration of an example wireless communications system that effectuates utilizing reselection indicators in access point reselection.

Now referring to FIG. 4, illustrated is a wireless communications system 400 that facilitates utilizing reselection indicators to mitigate interference caused to restricted association access points. Wireless device 402 can be a mobile device (including not only independently powered devices, but also modems, for example), a base station, and/or portion thereof, or substantially any wireless device. Access point 404 and/or restricted association access point 406 can be base stations, femtocell access points, picocell access points, relay nodes, and/or the like. Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between the wireless device 402 and access points 404/406.

The wireless device 402 can comprise an access point measuring component 302 that evaluates a plurality of surrounding access point to determine parameters related thereto, a reselection indicator receiving component 304 that can obtain a reselection indicator related to one or more access points specifying whether devices in-range of the access point(s) can perform intra-frequency reselection, an interference prediction component 306 that can estimate a level of interference caused by the wireless device 402 in communicating with one or more access points, a timer component 408 that can initialize and monitor one or more timers related to requesting a reselection indicator, and an access point reselection component 410 that can handover communication to a disparate access point (e.g., in an idle or active mode).

Access point 404 can comprise an interference offset component 412 that can specify an offset for overriding a reselection indicator, and access point 404 can comprise a reselection indicator component 414 that specifies a reselection indicator related to one or more access points in sector provided by the access point 404. The restricted association access point 406 can comprise a restricted association component 416 that indicates whether the restricted association access point 406 implements restricted association and a reselection indicator component 418 that specifies a reselection indicator for the restricted association access point 406, as described. It is to be appreciated that reselection indicator components 414 and 418 need not both be present, in one example.

According to an example, the wireless device 402 can communicate with the access point 404 to receive access to a wireless network. The access point measuring component 302 can evaluate surrounding access points for reselection by measuring one or more parameters related thereto, such as signal strength, in one example. The access point measuring component 302 can rank the access points according to the measured parameters, and the access point reselection component 410 can handover communication from the access point 404 to the highest ranked access point. As described, however, the highest ranked access point can implement restricted association, such as restricted association access point 406, such that the wireless device 402 cannot connect to the restricted association access point 406. In this example, as the access point measuring component 302 is evaluating restricted association access point 406, it can receive an indication of restricted association (such as a group identifier, restriction code, and/or the like) from the restricted association component 416. The access point reselection component 410 can determine whether the access point can be connected to by determining whether the restricted association indication is present in a stored list of allowed access points, in one example.

In addition, the reselection indicator receiving component 304 can obtain a reselection indicator related to the restricted association access point 406 from reselection indicator component 414 and/or 418. For example, the reselection indicator component 414 can provide indicators related to one or more access points in a sector provided by the access point 404. In this example, the access point 404 can be a macrocell access point, and the restricted association access point 406 can be located within the macrocell. The reselection indicator component 418 can provide a reselection indicator specific to the restricted association access point 406. It is to be appreciated that the reselection indicator receiving component 304 can receive the indicator from the reselection indicator component 414 and/or the reselection indicator component 418. Where received from both, the reselection indicator receiving component 304 can resolve possible conflicts based on information hardcoded in the wireless device 402, received from an underlying wireless network, received from one or more of the access points 404 and/or 406, and/or the like. In either case, for example, the reselection indicator component 414 and/or 418 can receive the indicator from an underlying wireless network, generate the indicator based at least in part on previous interference received from mobile devices communicating with disparate intra-frequency access points, and/or the like.

In addition, the reselection indicator receiving component 304 can receive the indicator related to the restricted association access point 406 during measuring by the access point measuring component 302, based on a request from the reselection indicator receiving component 304 (or other component of the wireless device 402), and/or the like. Furthermore, a timer component 408 can be employed to generate such requests for the indicator. For example, upon discovery by the access point measuring component 302, a request can be generated for the indicator. Where the reselection indicator receiving component 304 receives the indicator (e.g., from reselection indicator component 414 and/or 418) and the indicator is set to not allow intra-frequency reselection, the timer component 408 can initialize a timer for a subsequent request for the indicator. In one example, where the indicator so indicates that intra-frequency reselection is not allowed, the access point reselection component 410 cannot reselect in within the frequency. Thus, the access point reselection component 410, where in an idle mode, can wait for expiry of the timer and/or reselect in one or more different frequencies or over one or more different technologies, as described. If the access point reselection component 410 reselects to a cell in a disparate frequency, the timer component 408 can continue to run the timer so the reselection indicator receiving component 304 can continually check the indicator. In this regard, if the indicator switches to allow intra-frequency reselection, the access point reselection component 410 can reselect to the highest ranked cell in the frequency of the restricted association access point 406, in one example.

In another example, where the access point 404 is the highest ranked macrocell access point, the reselection indicator receiving component 304 can request the indicator related to the restricted association access point 406 regardless of reselection status. In this regard, the wireless device 402 communicating with the access point 404 can be causing substantial interference to the restricted association access point 406. Thus, in one example, the reselection indicator receiving component 304 can receive the indicator from the reselection indicator component 418, and where the indicator specifies that intra-frequency reselection is not allowed (e.g., and the access point 404 is in the same or similar frequency as restricted association access point 406) the access point reselection component 410 can evaluate access points in other frequencies and/or using other technologies for reselection. The reselection indicator receiving component 304 can receive the indicator based on a request, a timer, or otherwise. In one example, the reselection indicator component 418 can transmit the reselection indicator upon the restricted association access point 406 experiencing substantial interference.

According to another example, as described, the interference prediction component 306 can override a reselection indicator in one or more of the examples presented above. The interference prediction component 306 can estimate a level of interference caused to the restricted association access point 406 as a result of the wireless device 402 communicating with an intra-frequency access point. In one example, the interference prediction can be based at least in part on an offset received from the interference offset component 412. As described, for example, the interference prediction component 306 can utilize an algorithm including reference signal powers of the restricted association access point and intra-frequency access point as well as the offset to determine whether the indicator can be overridden. Thus, for example, where the reselection indicator receiving component 304 obtains an indicator related to the restricted association access point 406 specifying that intra-frequency reselection is not allowed, if the signal strength of the restricted association access point 406 is less than the signal strength of a target access point plus the offset, then the access point reselection component 410 can reselect the target access point regardless of the indicator. It is to be appreciated that the offset can be additionally or alternatively be received by other access points, the underlying wireless network, and/or the like.

In another example, where the access point 404 is a macrocell access point highest ranked by the access point measuring component 302, the reselection indicator receiving component 304 can request the indicator related to the restricted association access point 406, as described, since the high transmission power can cause interference to the restricted association access point 406. In addition, the interference prediction component 306 can override the indicator in this case according to a similar formula, where a negative offset can be utilized. For example, where the reference signal power of the restricted association access point 406 is less than that of the access point 404 (which is the highest ranked access point) plus a negative offset, the indicator can be ignored, and the wireless device 402 can continue communicating with the access point 404. The offset in both cases can be a static or dynamic parameter received from the interference offset component 412, known by the interference prediction component 306, etc. It can be received and/or requested according to the same or different timer kept by the timer component 408, for example.

Moreover, in an example, the wireless device 402 can evaluate multiple access points for reselection. Because the indicator can be overridden by the interference prediction component 306, and is access point specific, the access point measuring component 302 can continue measuring access points though the reselection indicator receiving component 304 can determine that it cannot override the indicator for one or more measured access points. In this regard, the access point reselection component 410 can receive a parameter relating to a number of access points to evaluate in a frequency without achieving reselection before it can switch frequencies and/or technologies. For example, below is an example list of access point cells encountered by the access point reselection component 410.

| Cell ranking | Cell type | Intra-frequency cell re-selection indicator | |
|---|---|---|---|
| 1 | CSG | Not Allowed | Cell 1 |
| 2 | CSG | Allowed | Cell 2 |
| 3 | CSG | Allowed | Cell 3 |
| 4 | Macro | N/A | Cell 4 |

In this example, cell 1 can be evaluated by the access point measuring component 302, and the not allowed indicator can be received by the reselection indicator receiving component 304. The access point measuring component 302 can continue evaluating the next highest ranked cell, cell 2, for which a restricted association indicator can be received, then on to cell 3, where another restricted association indicator can be received. In one example, the wireless device 402 may be able to access cells 1, 2, or 3, where it has the related CSG in a maintained list. The access point measuring component 302 can, in one example, measure cell 4, which is a macrocell. Thus, if the interference prediction component 306 determines the indicator from cell 1 can be overridden, the access point reselection component 410 can reselect cell 4 (if it is not the current cell utilized by the wireless device 402). In another example, however, the access point reselection component 410 can specify a number of access points, N, to consider before switching frequencies. Thus, for example, where N=3, once the access point measuring component 302 determines cell 3 is restricted association, it can scan one or more different frequencies or technology types to find other access points or related cells to reselect. In one example, a timer can be initialized by timer component 408 for each of cells 1-3 to determine whether the reselection indication and/or CSG status changes. In this regard, the access point measuring component 302 can compare the number of timers to the threshold number N to determine whether it should switch frequencies.

Referring to FIGS. 5-9, methodologies relating to utilizing reselection indicators to minimize interference for restricted association access points are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 5:
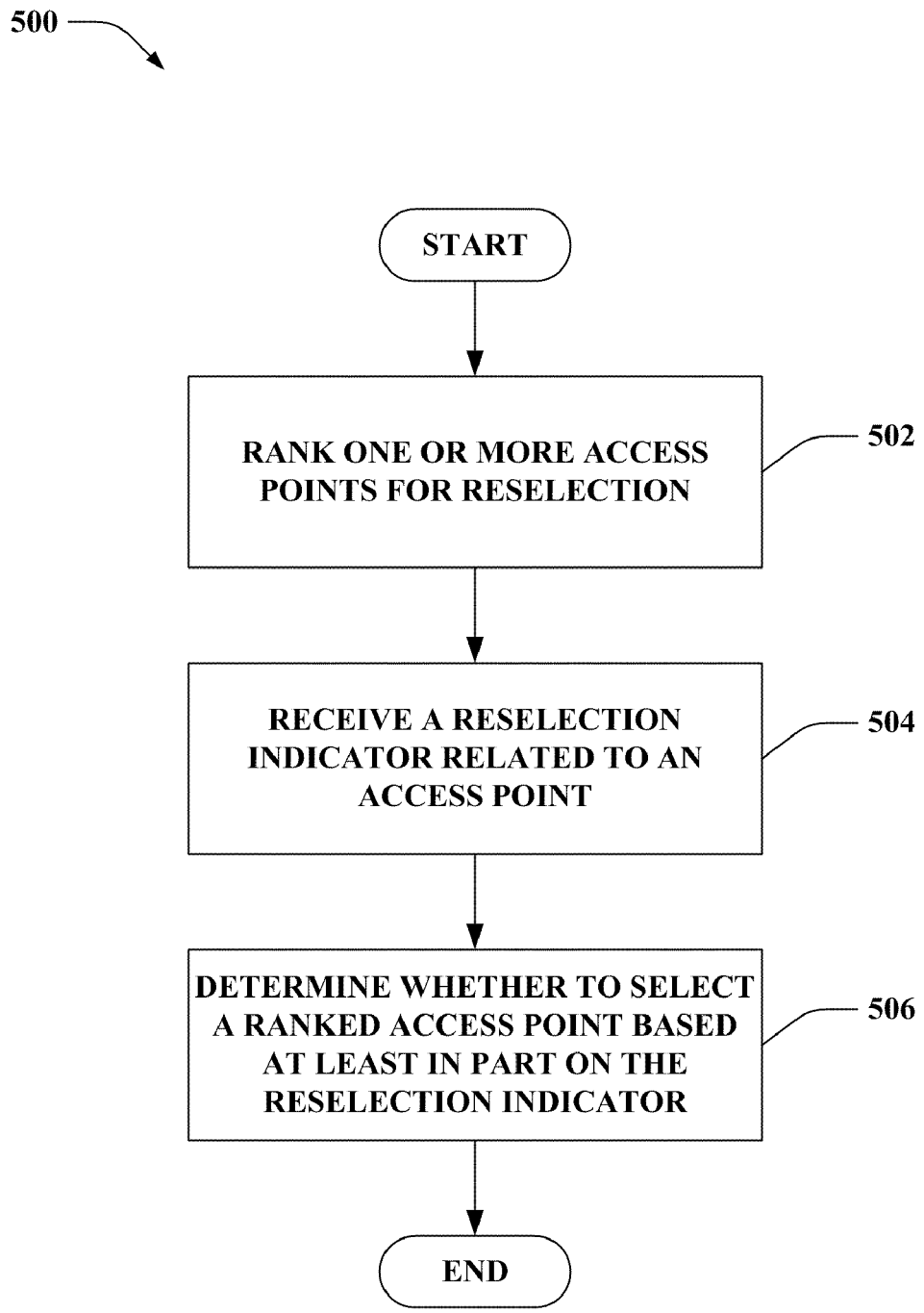
FIG. 5 is an illustration of an example methodology that facilitates reselecting access points based on a reselection indicator.

Turning to FIG. 5, an example methodology 500 that facilitates utilizing a reselection indicator during reselection is illustrated. At 502, one or more access points can be ranked for reselection. For example, one or more parameters relating to the access points can be measured, such as reference signal strength, level of interference, distance, etc. At 504, a reselection indicator related to the access point can be received. As described, the reselection indicator can specify whether reselection to an intra-frequency access point is allowed. At 506, it can be determined whether to reselect to a ranked access point based at least in part on the reselection indicator. As described, the determination can be further based at least in part on a predicted interference to the access point related to communicating with a disparate access point.

Figure 6:
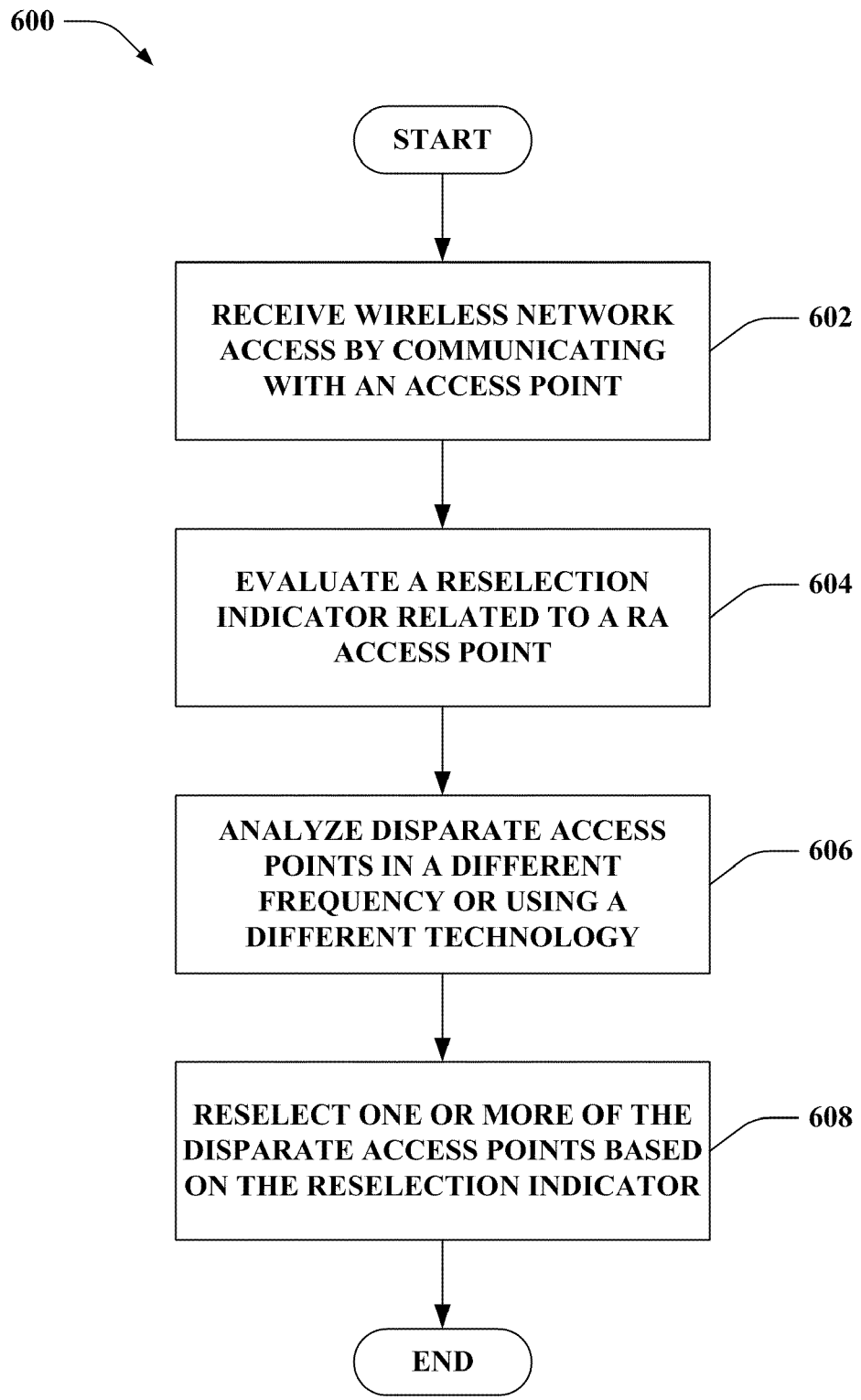
FIG. 6 is an illustration of an example methodology that facilitates reselecting an access point in a disparate frequency based on a reselection indicator.

Referring to FIG. 6, an example methodology 600 is shown that facilitates evaluating a reselection indicator when communicating with an access point. At 602, wireless network access can be received by communicating with an access point. At 604, a reselection indicator related to a restricted association (RA) access point can be evaluated. The reselection indicator can be received from one or more access points, such as the access point providing wireless network access, the restricted association access point, and/or the like, as described. Further the reselection indicator, in one example, can be received based on a timer. At 606, disparate access points in a different frequency or that use a different technology can be analyzed, and at 608, one or more of the disparate access point can be reselected based on the reselection indicator. Thus, for example, the restricted association access point can control communication with other access points to ensure it is not subject to substantial interference. As described, reselecting can be based further on a predicted interference to avoid against reselection indicators that are too strict.

Figure 7:
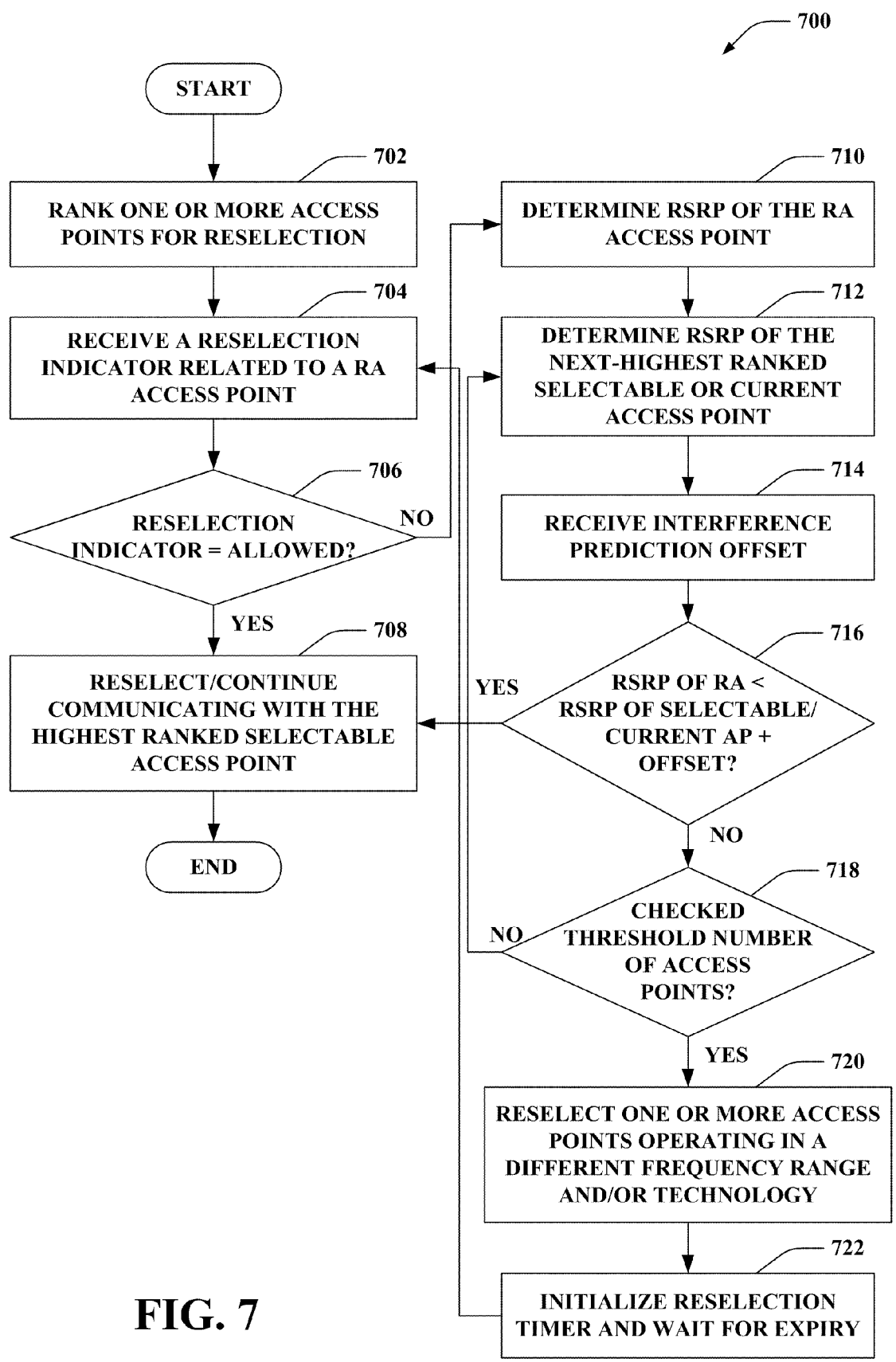
FIG. 7 is an illustration of an example methodology that evaluates reselection indicators to determine reselectable access points.

Turning now to FIG. 7, an example methodology 700 is illustrated that facilitates utilizing reselection indicators in reselecting and communicating with access points. At 702, one or more access points can be ranked for reselection. As described, this can include measuring one or more parameters related thereto and ranking based on the parameters. At 704, a reselection indicator related to a restricted association access point can be received. This can be received in access point measurement, according to a timer, based on a request, and/or the like. At 706 it can be determined whether the reselection indicator is set to allow intra-frequency reselection. If so, then the highest ranked selectable access point can be reselected, or in the case of current communication can continue communication, at 708. If not, then the RSRP of the restricted association access point can be determined at 710, along with the RSRP of the next-highest ranked selectable (e.g., if in a reselection mode) or current access point (e.g., if currently communicating to a macrocell base station) at 712.

At 714, an interference prediction offset can be received, as described, relating to interference caused to the restricted association access point by communicating with the next-highest ranked or current access point. In the case of current communication, as described, the offset can be negative. At 716, it is determined whether the RSRP of the restricted association access point is less than the RSRP of the selectable/current access point plus the offset. If so, then the reselection indicator is ignored, and the highest ranked selectable access point can be reselected and/or communication can continue at 708, as described. If not, then at 718, it can be determined whether a threshold number of access points have been checked against the formula in 716 without reselection. If not, the methodology continues at 712 to determine the RSRP of the next-highest ranked selectable access point. If so, then at 720 one or more access points operating in a different frequency range and/or technology can be reselected. This mitigates interference to the restricted association access point. At 722, a reselection timer can be initialized and expiry can be waited for, at which point the methodology can continue to 704 to recheck the reselection indicator in case it has been modified.

Figure 8:
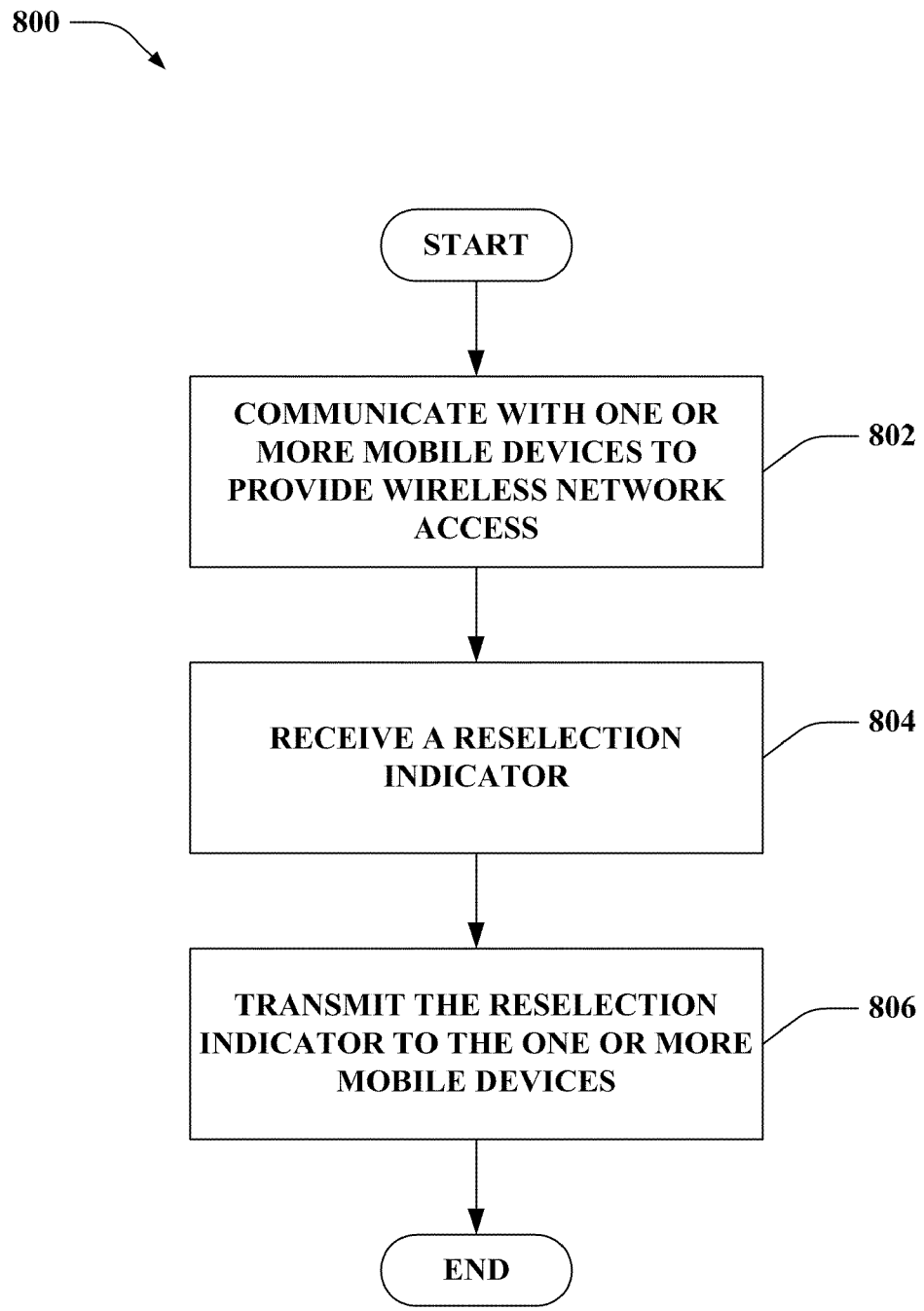
FIG. 8 is an illustration of an example methodology that facilitates providing a reselection indicator to one or more devices.

Referring to FIG. 8, an example methodology 800 is depicted that facilitates transmitting reselection indicators to one or more mobile devices. At 802, one or more mobile devices can be communicated with to provide wireless network access. For example, a sector can be provided that allows mobile devices to connect and communicate with the wireless network. At 804, a reselection indicator can be received. In an example, the indicator can be received from an underlying wireless network, generated based on previous interference levels, and/or the like. At 806, the reselection indicator can be transmitted to the one or more mobile devices for which network access is provided. The reselection indicator, as described, can specify whether intra-frequency reselection is allowed.

Figure 9:
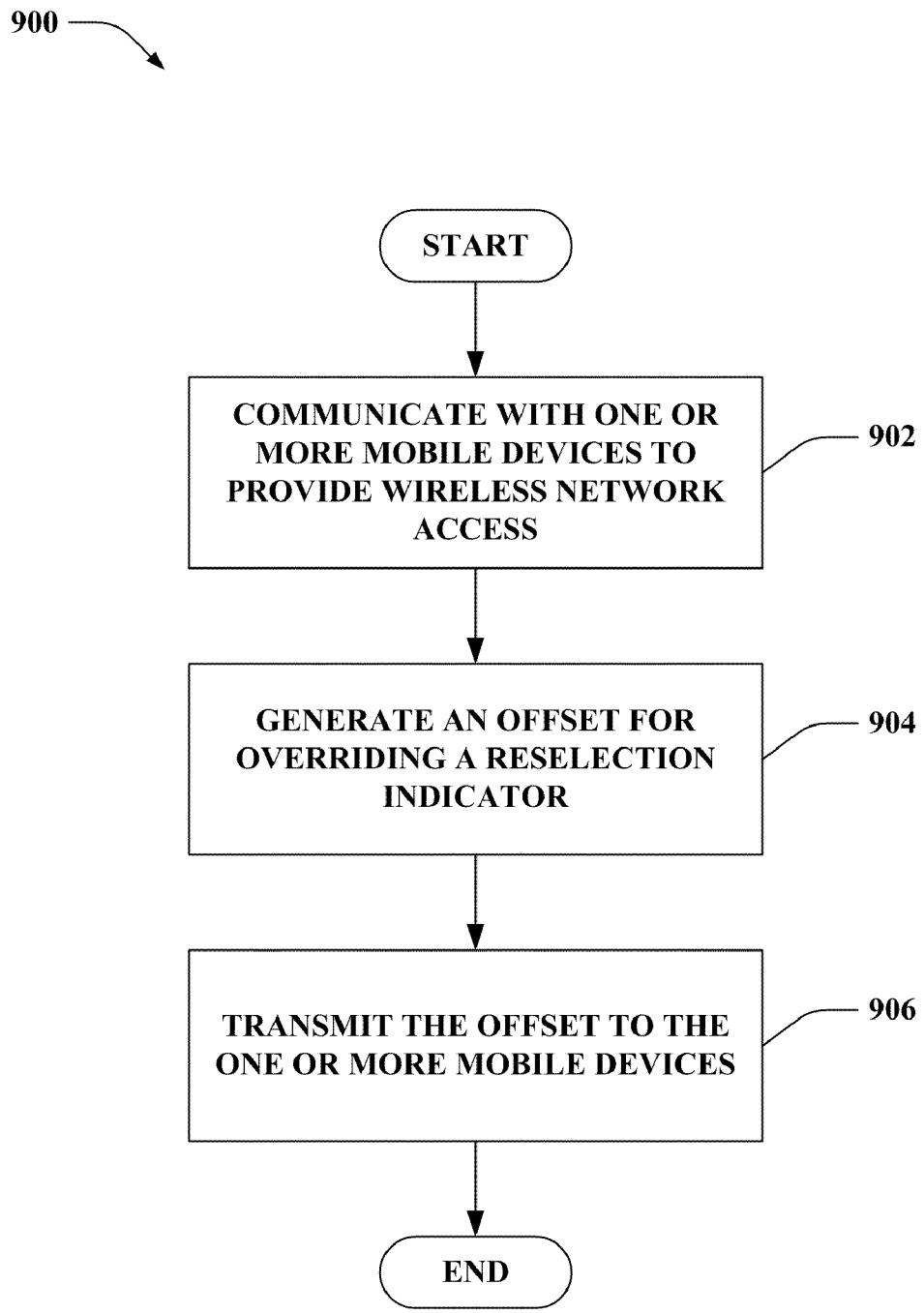
FIG. 9 is an illustration of an example methodology that facilitates providing a predicted interference level offset for determining whether to override a reselection indicator.

Turning to FIG. 9, an example methodology 900 is shown that generates an offset for overriding a reselection indicator, as described. At 902, one or more mobile devices can be communicated with to provide wireless network access. At 904, an offset for overriding a reselection indicator can be generated. The offset can be fixed or dynamic, based on the access point related to the reselection indicator, and/or the like. Furthermore, the offset can be negative, for example, where one or more mobile devices are communicating with a highest ranked access point that is a macrocell. At 906, the offset can be transmitted to one or more mobile devices, as described.

It will be appreciated that, in accordance with one or more aspects described herein, inferences can be made regarding determining reselection indicators or related timers, overriding the reselection indicators, predicting interference caused from communication, generating offsets related to the predicted interference, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
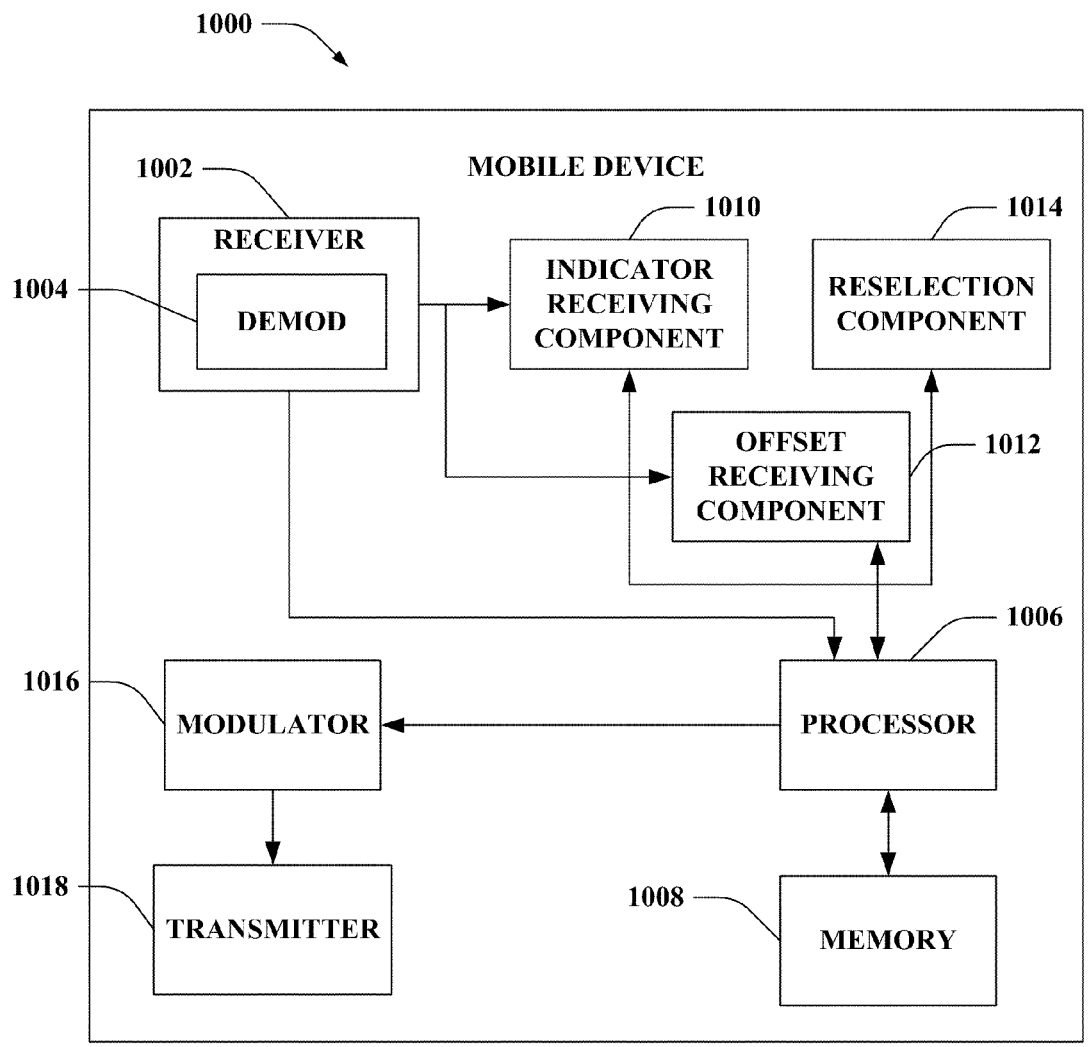
FIG. 10 is an illustration of an example mobile device that facilitates receiving reselection indicators.

FIG. 10 is an illustration of a mobile device 1000 that facilitates access point reselection according to received reselection indicators. Mobile device 1000 comprises a receiver 1002 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 1002 can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1018, a processor that controls one or more components of mobile device 1000, and/or a processor that both analyzes information received by receiver 1002, generates information for transmission by transmitter 1018, and controls one or more components of mobile device 1000.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 and/or processor 1006 can further be operatively coupled to an indicator receiving component 1010 that can obtain a reselection indicator related to a restricted association access point and an offset receiving component 1012 that can receive a interference prediction offset, as described. In addition, the processor 1006 can be coupled to a reselection component 1014 that initiates access point reselection by measuring surrounding access points, ranking the access point according to one or more measured parameters, and reselecting to a highest ranked selectable access point. For example, the reselection component 1014 can measure surrounding access points, and the indicator receiving component 1010 can evaluate reselection indicators related to the surrounding access points, which can be received from the respective access points or a macrocell base station related to substantially all access points in a given sector, for example.

If encountered indicators specify that intra-frequency reselection is allowed, the reselection component 1014 can reselect to the highest ranked selectable access point. If, however, an indicator specifies that intra-frequency reselection is not allowed, the offset receiving component 1012 can obtain an offset, as described, and compute a predicted level of interference. If the level plus the offset is less than a power of the access point related to the indicator, the indicator can be ignored, as described, and the access point to which the offset relates can be reselected. In addition, the components described can be used to determine whether to reselect when communicating with the highest ranked macrocell base station, as described above, to determine a number of predicted interference level comparisons before switching frequencies, as described, timed reevaluation of the indicator, as described, and/or the like. Mobile device 1000 still further comprises a modulator 1016 and transmitter 1018 that respectively modulate and transmit signals to, for instance, a base station, another mobile device, etc. Although depicted as being separate from the processor 1006, it is to be appreciated that the demodulator 1004, indicator receiving component 1010, offset receiving component 1012, reselection component 1014, and/or modulator 1016 can be part of the processor 1006 or multiple processors (not shown).

Figure 11:
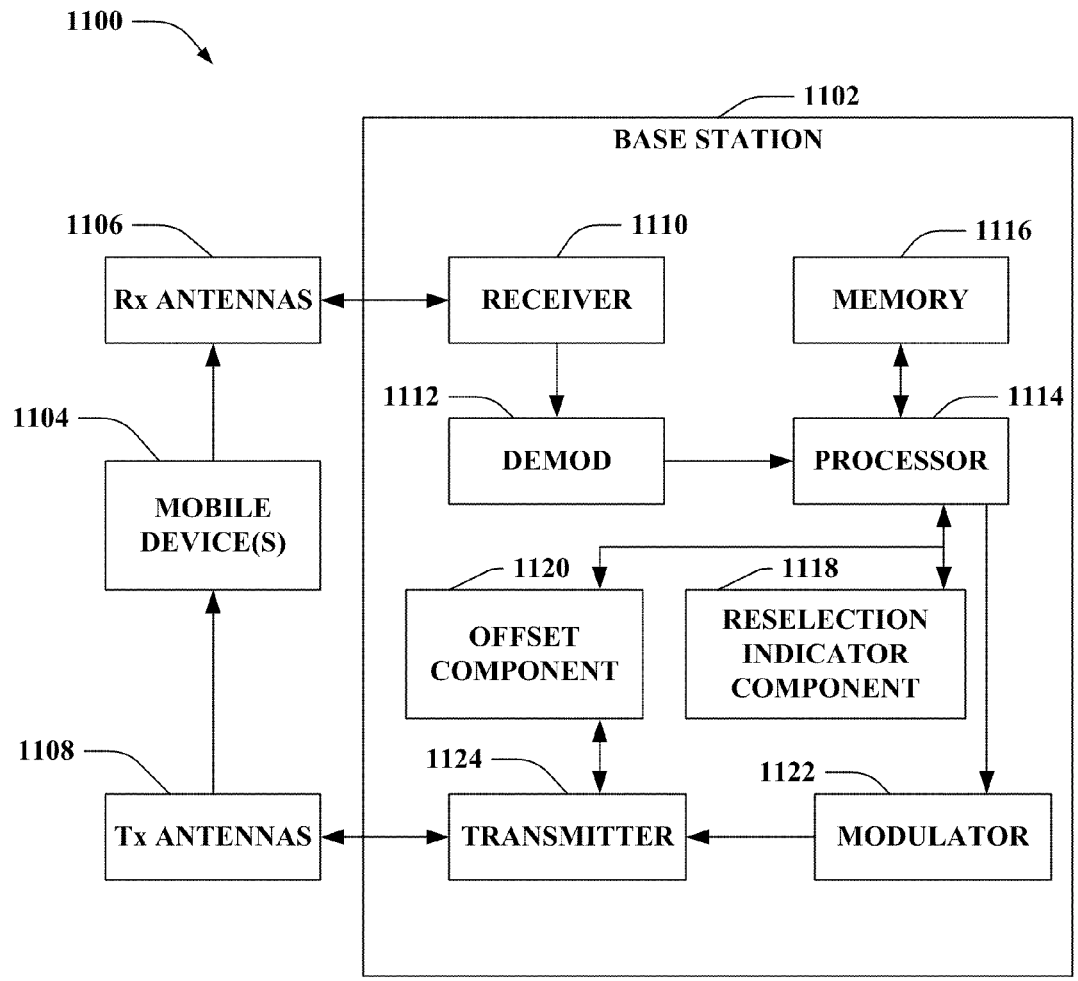
FIG. 11 is an illustration of an example system that provides reselection indicators and/or interference level offsets.

FIG. 11 is an illustration of a system 1100 that facilitates providing reselection indicators to mitigate interference in access point reselection. The system 1100 comprises a base station 1102 (e.g., access point, . . . ) with a receiver 1110 that receives signal(s) from one or more mobile devices 1104 through a plurality of receive antennas 1106, and a transmitter 1124 that transmits to the one or more mobile devices 1104 through a transmit antenna 1108. Receiver 1110 can receive information from receive antennas 1106 and is operatively associated with a descrambler that can decode received signals. Furthermore, demodulator 1112 can demodulate received descrambled signals. Demodulated symbols are analyzed by a processor 1114 that can be similar to the processor described above with regard to FIG. 7, and which is coupled to a memory 1116 that stores information related to estimating a signal (e.g. pilot) strength and/or interference strength, data to be transmitted to or received from mobile device(s) 1104 (or a disparate base station (not shown)), and/or any other suitable information related to performing the various actions and functions set forth herein. Processor 1114 is further coupled to a reselection indicator component 1118 that generates a reselection indicator based on information received from an underlying wireless network, inferred from previous interference measurements, hardcoded, and/or the like, as well as an offset component 1120 that generates a prediction level offset, as described, for determining whether to override a reselection indicator.

According to an example, reselection indicator component 1118 can generate a reselection indicator, as described, which can be transmitted to the mobile devices 1104 based on a request, timer, and/or the like. In addition, the offset component 1120 can generate an offset for computing predicted interference; the offset can be specified by an underlying wireless network, hardcoded, and/or the like. The offset can similarly be transmitted to the mobile devices 1104 to facilitate determining whether to override a reselection indicator related to a disparate access point. Furthermore, although depicted as being separate from the processor 1114, it is to be appreciated that the demodulator 1112, reselection indicator component 1118, offset component 1120, and/or modulator 1122 can be part of the processor 1114 or multiple processors (not shown).

Figure 12:
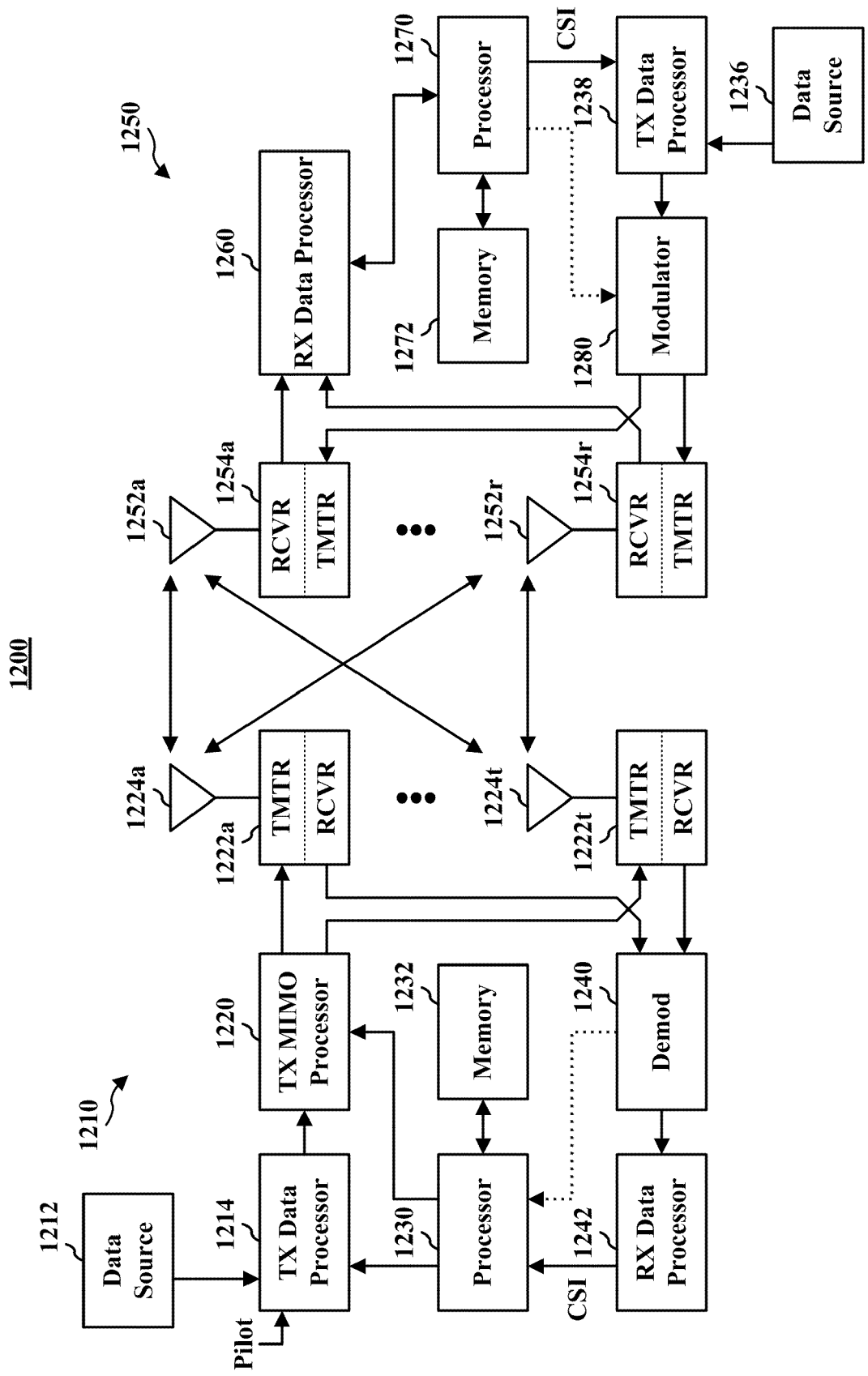
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-4 and 10-11) and/or methods (FIGS. 5-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various aspects, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the NR received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which preceding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which preceding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
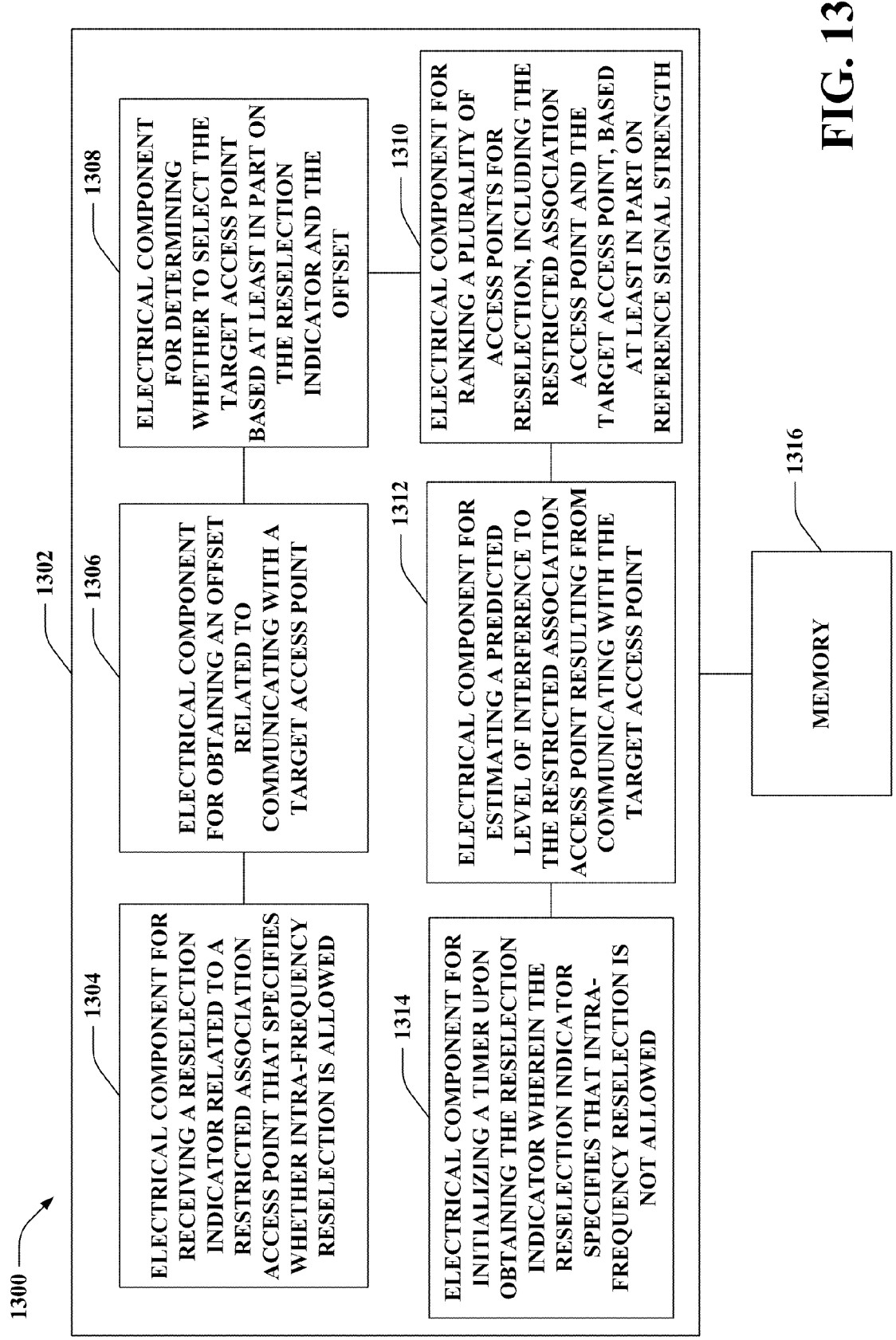
FIG. 13 is an illustration of an example system that utilizes reselection indicators in determining whether to reselect one or more access points.

With reference to FIG. 13, illustrated is a system 1300 that utilizes reselection indicators in determining access points to reselect in wireless communications. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a reselection indicator related to a restricted association access point that specifies whether intra-frequency reselection is allowed 1304. For example, as described, the restricted association access point can provide a CSG identifier, which can be evaluated to determine whether connection to the access point is not allowed. In addition, logical grouping 1302 can include an electrical component for obtaining an offset related to communicating with a target access point 1306. As described, the offset can be related to estimating a level of interference caused to the restricted association access point by communicating with the target access point. Further, logical grouping 1302 can comprise an electrical component for determining whether to select (e.g., reselect, camp on, etc.) the target access point based at least in part on the reselection indicator and the offset 1308.

Furthermore, logical grouping 1302 can include an electrical component for ranking a plurality of access points for reselection, including the restricted association access point and the target access point, based at least in part on reference signal strength 13 10. Thus, for example, where the highest ranked access point is a restricted association access point that cannot be connected to, reselection can move to the next highest ranked access point, as described. In addition, logical grouping 1302 can include an electrical component for estimating a predicted level of interference to the restricted association access point resulting from communication with the target access point 1312. For example, the electrical component 1308 can determine whether to reselect based at least in part on the predicted level of interference, as described. Further, logical grouping 1302 can include an electrical component for initializing a timer upon obtaining the reselection indicator wherein the reselection indicator specifies that intra-frequency reselection is not allowed 1314. Thus, upon expiry of the timer, the reselection indicator can be reevaluated, as described. Additionally, system 1300 can include a memory 1316 that retains instructions for executing functions associated with electrical components 1304, 1306, 1308, 1310, 1312, and 1314. While shown as being external to memory 1316, it is to be understood that one or more of electrical components 1304, 1306, 1308, 1310, 1312, and 1314 can exist within memory 1316.

Figure 14:
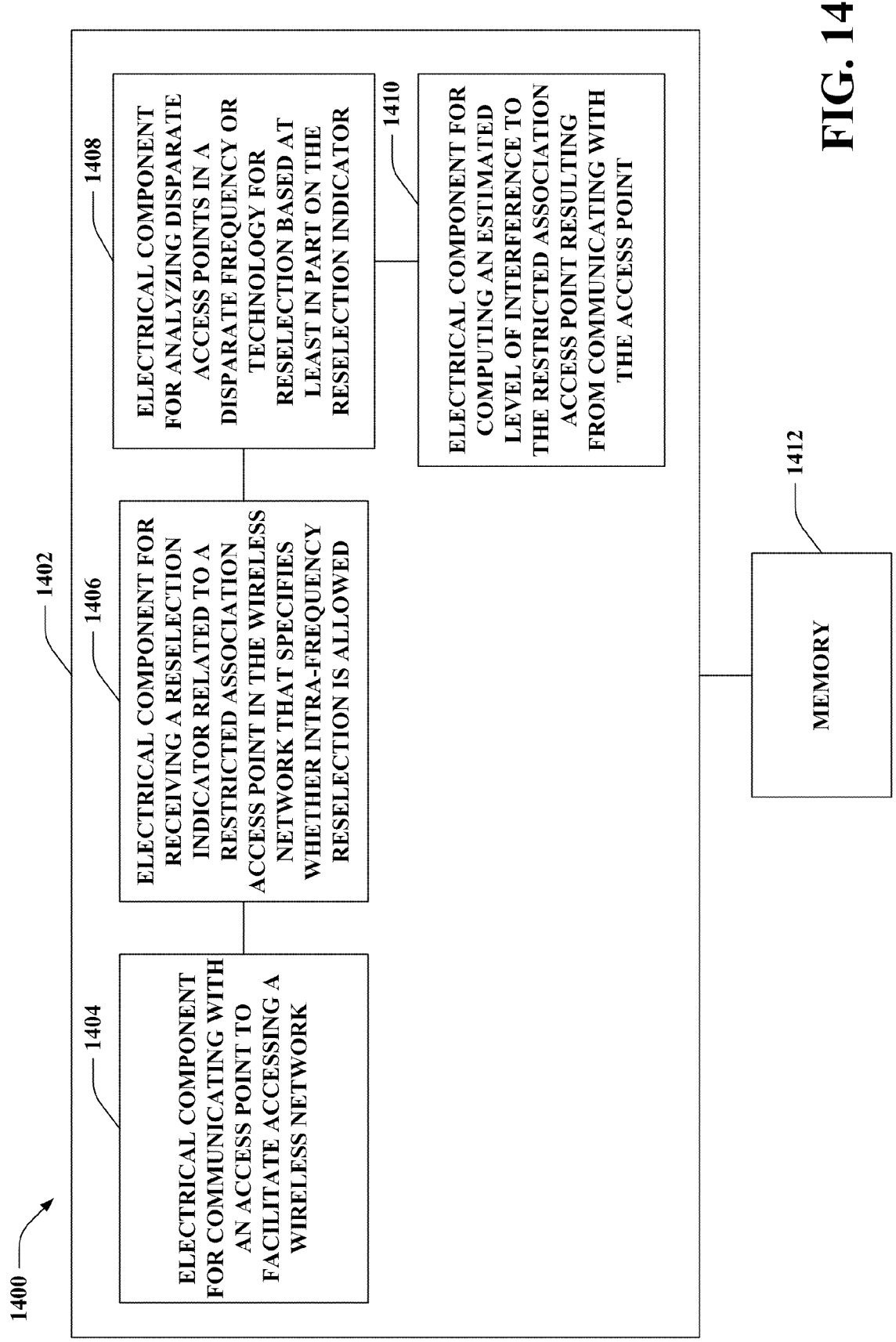
FIG. 14 is an illustration of an example system that utilizes reselection indicators to determine whether to continue communicating with a current access point.

With reference to FIG. 14, illustrated is a system 1400 that utilizes reselection indicators in determining whether to reselect one or more access points in a disparate frequency range. For example, system 1400 can reside at least partially within a base station, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for communicating with an access point to facilitate accessing a network 1404. Further, logical grouping 1402 can comprise an electrical component for receiving a reselection indicator related to a restricted association access point in the wireless network that specifies whether intra-frequency reselection is allowed 1406.

Furthermore, logical grouping 1402 can include an electrical component for analyzing disparate access points in a disparate frequency or technology for reselection based at least in part on the reselection indicator 1408. Thus, for example, if intra-frequency reselection is not allowed according to the reselection indicator, it is likely communication with the access point providing wireless network access is interfering with the restricted association access point. In one example, then, communication with the access point can cease and other access points in different frequencies/technologies can be evaluated for communication, as described. In addition, logical grouping 1402 can include an electrical component for computing an estimated level of interference to the restricted association access point resulting from communication with the access point 1410. For example, the electrical component 1408 can determine whether to evaluate the disparate access points based on the estimated level. Where the level is not above a threshold as related to interfering with the restricted association access point, the reselection indicator can be ignored, as described. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
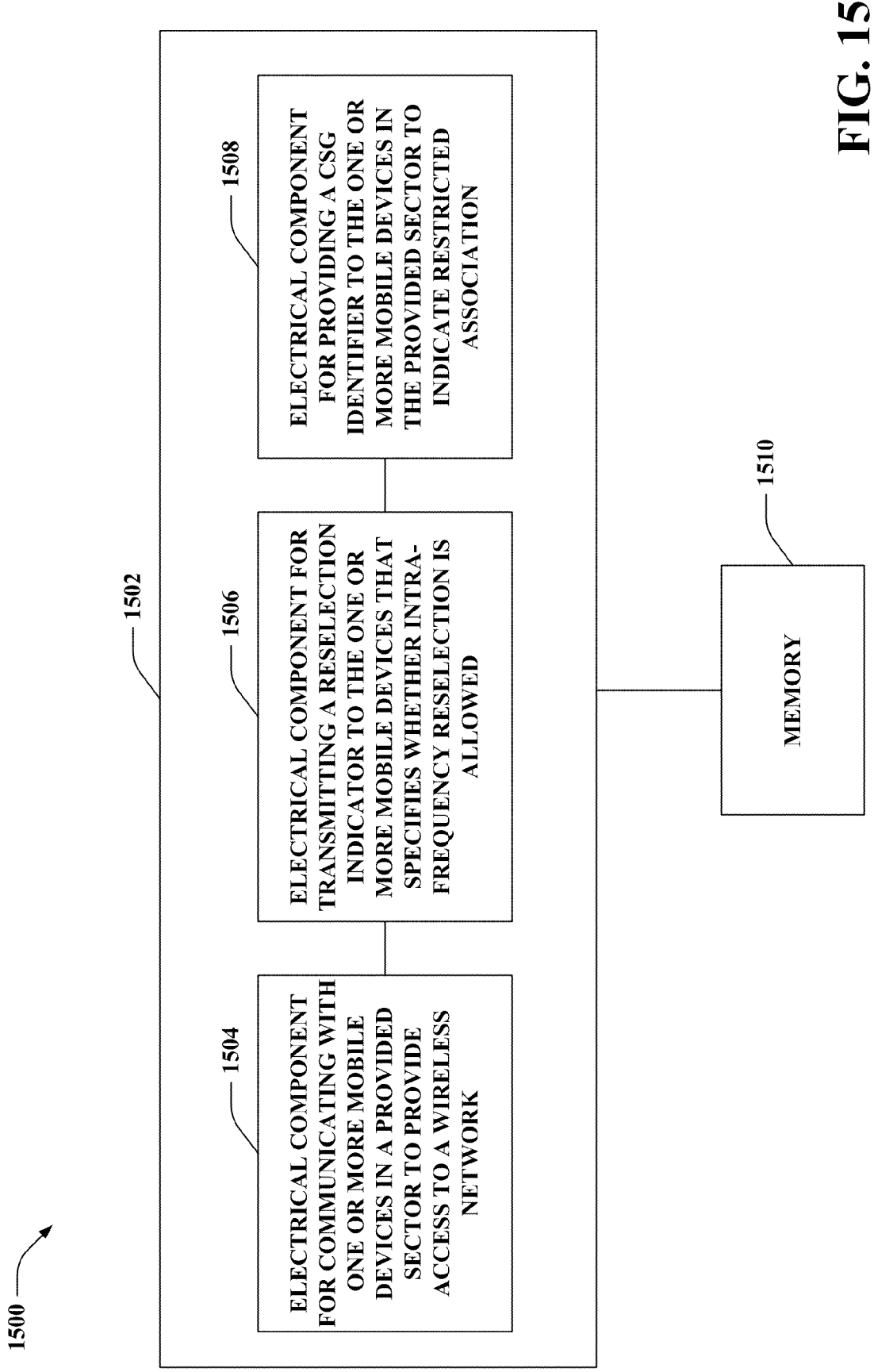
FIG. 15 is an illustration of an example system that provides reselection indicators to one or more mobile devices.

With reference to FIG. 15, illustrated is a system 1500 that provides reselection indicators to mitigate interference from devices and disparate access points. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for communicating with one or more mobile devices in a provided sector to provide access to a wireless network 1504. Further, logical grouping 1502 can comprise an electrical component for transmitting a reselection indicator to the one or more mobile devices that specifies whether intra-frequency reselection is allowed 1506. The indicator, as described, can be received from an underlying wireless network, generated from other parameters, and/or the like. Moreover, the indicator can relate to the system 1500 or a disparate access point. Furthermore, logical grouping 1502 can include an electrical component for providing a CSG identifier to the one or more mobile devices in the provided sector to indicate restricted association 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

Figure 16:
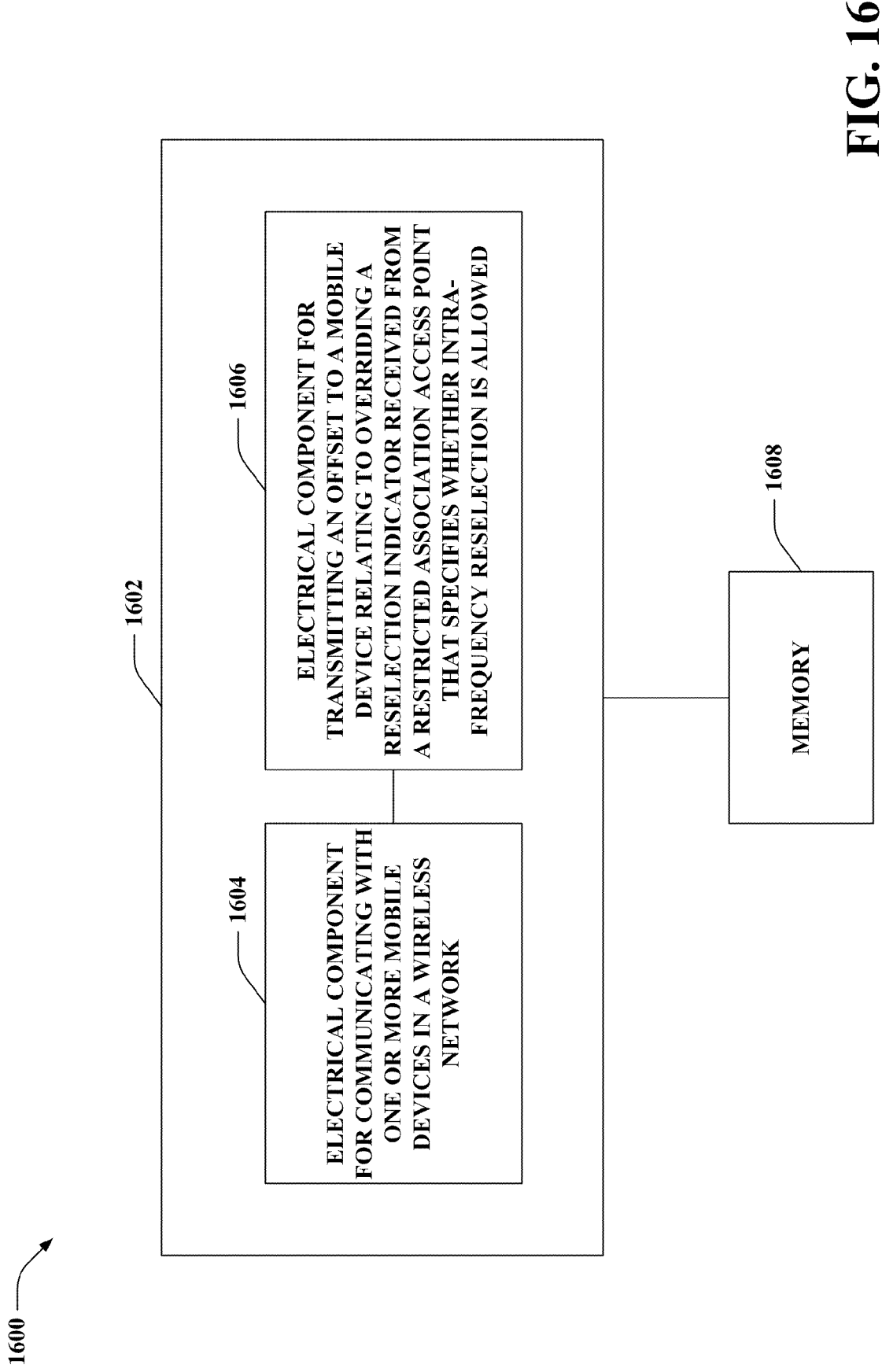
FIG. 16 is an illustration of an example system that provides interference level offsets to one or more devices.

With reference to FIG. 16, illustrated is a system 1600 that provides an offset for utilization in computing a predicted level of interference in communicating with the system. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for communicating with one or more mobile devices in a wireless network 1604. Further, logical grouping 1602 can comprise an electrical component for transmitting an offset to a mobile device relating to overriding a reselection indicator received from a restricted association access point that specifies whether intra-frequency reselection is allowed 1606. As described, the offset can relate to the system 1602 and can be utilized in determining whether a level of interference is small enough as compared to a restricted association access point to override a reselection indicator related thereto. Additionally, system 1600 can include a memory 1608 that retains instructions for executing functions associated with electrical components 1604 and 1606. While shown as being external to memory 1608, it is to be understood that one or more of electrical components 1604 and 1606 can exist within memory 1608.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving a reselection indicator related to a restricted association access point that specifies whether intra-frequency reselection is allowed;
   receiving an offset related to predicting interference caused to the restricted association access point by communicating with a target access point that operates in a similar frequency region as the restricted association access point; and
   determining whether to select the target access point based on the reselection indicator and the offset, wherein the reselection indicator is overridden where a predicted level of interference resulting from communicating with the target access point is below a threshold level.

2. The method of claim 1, further comprising ranking one or more access points, including the restricted association access point and the target access point wherein the restricted association access point ranked higher than the target access point.

3. The method of claim 1, further comprising computing the predicted level of interference resulting from communicating with the target access point.

4. The method of claim 3, wherein computing the predicted level of interference includes comparing a reference signal received power (RSRP) of the restricted association access point to that of the target access point added to the offset.

5. The method of claim 4, further comprising computing a disparate predicted level of interference related to a lower ranked target access point where the predicted level of interference resulting from communication with the target access point exceeds the threshold level for overriding the reselection indicator.

6. The method of claim 5, further comprising evaluating access points on a disparate frequency or technology for reselection based at least in part on determining that the disparate predicted level of interference is beyond the threshold level for overriding the reselection indicator.

7. The method of claim 1, further comprising initializing a timer upon receiving the reselection indicator wherein the reselection indicator specifies that intra-frequency reselection is not allowed.

8. The method of claim 7, further comprising:
   reading a second reselection indicator upon expiry of the timer; and
   determining whether to select the target access point based on the second reselection indicator and the offset.

9. The method of claim 1, wherein the reselection indicator is received from a macrocell base station that provides a sector in which the restricted association access point is located.

10. The method of claim 9, wherein the reselection indicator applies to substantially all restricted association access points located within the sector.

11. The method of claim 9, wherein the reselection indicator is received along with additional system information of the sector.

12. The method of claim 1, wherein the reselection indicator is received from the restricted association access point.

13. A wireless communications apparatus, comprising:
    at least one processor configured to:
       obtain a reselection indicator related to a restricted association access point that specifies whether intra-frequency access point reselection is allowed;
       receive an offset related to potential interference caused from communicating with a target access point that operates in a similar frequency region as the restricted association access point; and
       determine whether to select the target access point based at least in part on the reselection indicator and the offset, wherein the reselection indicator is overridden where a predicted level of interference resulting from communicating with the target access point is below a threshold level; and
    a memory coupled to the at least one processor.

14. The wireless communications apparatus of claim 13, wherein the at least one processor is further configured to rank access points for reselection where the restricted association access point is ranked higher than the target access point.

15. The wireless communications apparatus of claim 13, wherein the at least one processor is further configured to compute the predicted level of interference to the restricted association access point resulting from communicating with the target access point and the at least one processor determines whether to select the target access point further based at least in part on the predicted level of interference.

16. The wireless communications apparatus of claim 15, wherein the at least one processor computes the predicted level of interference at least in part by comparing a reference signal received power (RSRP) of the restricted association access point to that of the target access point added to the offset.

17. The wireless communications apparatus of claim 16, wherein the at least one processor is further configured to compute a disparate predicted level of interference related to a lower ranked target access point where the predicted level of interference resulting from communication with the target access point exceeds the threshold level for overriding the reselection indicator.

18. The wireless communications apparatus of claim 17, wherein the at least one processor is further configured to analyze access points on a disparate frequency or technology for reselection based at least in part on determining that the disparate predicted level of interference is beyond the threshold level for overriding the reselection indicator.

19. The wireless communications apparatus of claim 13, wherein the at least one processor is further configured to initialize a timer upon obtaining the reselection indicator wherein the reselection indicator specifies that intra-frequency reselection is not allowed.

20. The wireless communications apparatus of claim 19, wherein the at least one processor is further configured to receive a disparate reselection indicator related to the restricted association access point upon expiration of the timer.

21. The wireless communications apparatus of claim 13, wherein the at least one processor obtains the reselection indicator from a macrocell base station that provides a sector within which the restricted association access point is located.

22. The wireless communications apparatus of claim 21, wherein the reselection indicator applies to substantially all restricted association access points located within the sector.

23. An apparatus, comprising:
means for receiving a reselection indicator related to a restricted association access point that specifies whether intra-frequency reselection is allowed;
means for obtaining an offset related to potential interference caused from communicating with a target access point that operates in a similar frequency region as the restricted association access point; and
means for determining whether to select the target access point based at least in part on the reselection indicator and the offset, wherein the reselection indicator is overridden where a predicted level of interference resulting from communicating with the target access point is below a threshold level.

24. The apparatus of claim 23, further comprising means for ranking a plurality of access points for reselection, including the restricted association access point and the target access point, based at least in part on reference signal strength wherein the restricted association access point is ranked higher than the target access point.

25. The apparatus of claim 23, further comprising means for estimating the predicted level of interference to the restricted association access point resulting from communicating with the target access point wherein the means for determining determines whether to select the target access point further based at least in part on the predicted level of interference.

26. The apparatus of claim 25, wherein the means for estimating the predicted level of interference compares a reference signal received power (RSRP) of the restricted association access point to that of the target access point added to the offset.

27. The apparatus of claim 26, wherein the means for estimating further estimates a disparate predicted level of interference related to a lower ranked target access point where the predicted level of interference resulting from communication with the target access point exceeds the threshold level for overriding the reselection indicator.

28. The apparatus of claim 27, wherein the means for determining whether to select the target access point evaluates access points on a disparate frequency or technology for reselection based at least in part on determining that the disparate predicted level of interference is beyond the threshold level for overriding the reselection indicator.

29. The apparatus of claim 23, further comprising means for initializing a timer upon obtaining the reselection indicator wherein the reselection indicator specifies that intra-frequency reselection is not allowed.

30. The apparatus of claim 29, wherein the means for receiving the reselection indicator further receives a disparate reselection indicator related to the restricted association access point upon expiry of the timer.

31. The apparatus of claim 23, wherein the means for receiving receives the reselection indicator from a macrocell base station that provides a sector within which the restricted association access point is located.

32. The apparatus of claim 31, wherein the reselection indicator relates to substantially all restricted association access points located within the sector.

33. A computer program product embodied on a non-transitory computer-readable medium comprising:
code for causing at least one computer to receive a reselection indicator related to a restricted association access point that specifies whether intra-frequency reselection is allowed;
code for causing the at least one computer to receive an offset related to predicting interference caused to the restricted association access point by communicating with a target access point that operates in a similar frequency region as the restricted association access point; and
code for causing the at least one computer to determine whether to select the target access point based on the reselection indicator and the offset, wherein the reselection indicator is overridden where a predicted level of interference resulting from communicating with the target access point is below a threshold level.

34. The computer program product of claim 33, wherein the computer-readable medium further comprises code for causing the at least one computer to rank one or more access points, including the restricted association access point and the target access point wherein the restricted association access point is ranked higher than the target access point.

35. The computer program product of claim 33, wherein the computer-readable medium further comprises code for causing the at least one computer to compute the predicted level of interference resulting from communicating with the target access point wherein determining whether to select the target access point is further based at least in part on computing the predicted level of interference.

36. The computer program product of claim 35, wherein the code for causing the at least one computer to compute the predicted level of interference includes comparing a reference signal received power (RSRP) of the restricted association access point to that of the target access point added to the offset.

37. The computer program product of claim 36, wherein the computer-readable medium further comprises code for causing the at least one computer to compute a disparate predicted level of interference related to a lower ranked target access point where the predicted level of interference resulting from communication with the target access point exceeds the threshold level of overriding the reselection indicator.

38. The computer program product of claim 37, wherein the computer-readable medium further comprises code for causing the at least one computer to evaluate access points on a disparate frequency or technology for reselection based at least in part on determining that the disparate predicted level of interference is beyond the threshold level for overriding the reselection indicator.

39. The computer program product of claim 33, wherein the computer-readable medium further comprises code for causing the at least one computer to initialize a timer upon receiving the reselection indicator wherein the reselection indicator specifies that intra-frequency reselection is not allowed.

40. The computer program product of claim 39, wherein the code for causing the at least one computer to receive the reselection indicator further receives a disparate reselection indicator related to the restricted association access point upon expiry of the timer.

41. The computer program product of claim 33, wherein the computer-readable medium further comprises code for causing the at least one computer to receive the reselection indicator from a macrocell base station that provides a sector in which the restricted association access point is located.

42. The computer program product of claim 41, wherein the reselection indicator applies to substantially all restricted association access points located within the sector.

43. A wireless device, comprising:
a reselection indicator receiving component that obtains a reselection indicator related to a restricted association access point that specifies whether intra-frequency reselection is allowed;
an interference prediction component that receives an offset related to interference caused by communicating with a target access point that operates in a similar frequency range as the restricted association access point; and
an access point reselection component that determines whether to select a target access point based at least in part on the reselection indicator and the offset, wherein the reselection indicator is overridden where a predicted level of interference resulting from communicating with the target access point is below a threshold level.

44. The wireless device of claim 43, further comprising an access point measuring component that ranks a plurality of access points of reselection, including the restricted association access point and the target access point, based at least in part on reference signal strength wherein the restricted association access point is ranked higher than the target access point.

45. The wireless device of claim 43, further comprising an interference prediction component that estimates the predicted level of interference to the restricted association access point resulting from communicating with the target access point wherein the access point reselection component determines whether to select the target access point further based at least in part on the predicted level of interference.

46. The wireless device of claim 45, wherein the interference prediction component further compares a reference signal received power (RSRP) of the restricted association access point to that of the target access point added to the offset.

47. The wireless device of claim 46, wherein the interference prediction component further estimates a disparate predicted level of interference related to a lower ranked target access point where the predicted level of interference resulting from communication with the target access point exceeds the threshold level for overriding the reselection indicator.

48. The wireless device of claim 47, wherein the access point reselection component evaluates access points on a disparate frequency or technology for reselection based at least in part on determining that the disparate predicted level of interference is beyond the threshold level for overriding the reselection indicator.

49. The wireless device of claim 43, further comprising a timer component that initializes a timer upon obtaining the reselection indicator wherein the reselection indicator specifies that intra-frequency reselection is not allowed.

50. The wireless device of claim 49, wherein the reselection indicator receiving component further receives a disparate reselection indicator related to the restricted association access point upon expiry of the timer.

51. The wireless device of claim 43, wherein the reselection indicator receiving component receives the reselection indicator from a macrocell base station that provides a sector within which the restricted association access point is located.

52. The wireless device of claim 51, wherein the reselection indicator relates to substantially all restricted association access points located within the sector.

53. A method, comprising:
communicating with an access point to facilitate accessing a wireless network;
evaluating a reselection indicator related to a restricted association access point in the wireless network that specifies whether intra-frequency reselection is allowed; and
analyzing disparate access points in a disparate frequency for reselection based at least in part on the reselection indicator, wherein analyzing access points in the disparate frequency for reselection is further based at least in part on computing an estimated level of interference to the restricted association access point resulting from communicating with the access point, and wherein the reselection indicator is overridden where the estimated level of interference is below a threshold level.

54. The method of claim 53, wherein computing the estimated level of interference includes comparing a reference signal received power (RSRP) of the restricted association access point to that of the access point based on a negative offset.

55. The method of claim 54, further comprising receiving the negative offset from the access point.

56. A wireless communications apparatus, comprising:
at least one processor configured to:
receive wireless network access from an access point;
evaluate a reselection indicator related to a restricted association access point in the wireless network that specifies whether intra-frequency reselection is allowed; and
analyze disparate access points in a disparate frequency for reselection based at least in part on the reselection indicator, wherein the at least one processor is further configured to compute an estimated level of interference to the restricted association access point resulting from communicating with the access point wherein the at least one processor analyzes access points in the disparate frequency for reselection further based at least in part on the estimated level of interference, and wherein the reselection indicator is overridden where the estimated level of interference is below a threshold level; and
a memory coupled to the at least one processor.

57. The wireless communications apparatus of claim 56, wherein that at least one processor computes the estimated level of interference based on comparing a reference signal received power (RSRP) of the restricted association access point to that of the access point subtracting an offset.

58. The wireless communications apparatus of claim 57, wherein the at least one processor is further configured to receive the offset from the access point.

59. An apparatus, comprising:
means for communicating with an access point to facilitate accessing a wireless network;
means for receiving a reselection indicator related to a restricted association access point in the wireless network that specifies whether intra-frequency reselection is allowed;
means for analyzing disparate access points in a disparate frequency or technology for reselection based at least in part on the reselection indicator; and
means for computing an estimated level of interference to the restricted association access point resulting from communicating with the access point, wherein the means for analyzing disparate access points analyzes access points in the disparate frequency for reselection further based at least in part on the estimated level of interference, and wherein the reselection indicator is overridden where the estimated level of interference is below a threshold level.

60. The apparatus of claim 59, wherein the means for computing the estimated level of interference computes based at least in part on comparing a reference signal received power (RSRP) of the restricted association access point to that of the access point adding a negative offset.

61. The apparatus of claim 60, wherein the means for computing the estimated level of interference receives the negative offset from the access point.

62. A computer program product embodied on a non-transitory computer-readable medium comprising:
  code for causing at least one computer to communicate with an access point to facilitate accessing a wireless network;
  code for causing the at least one computer to evaluate a reselection indicator related to a restricted association access point in the wireless network that specifies whether intra-frequency reselection is allowed; and
  code for causing the at least one computer to analyze disparate access points in a disparate frequency for reselection based at least in part on the reselection indicator, wherein analyzing access points in the disparate frequency for reselection is further based at least in part on computing an estimated level of interference to the restricted association access point resulting from communicating with the access point, and wherein the reselection indicator is overridden where the estimated level of interference is below a threshold level.

63. The computer program product of claim 62, wherein computing the estimated level of interference includes comparing a reference signal received power (RSRP) of the restricted association access point to that of the access point based on a negative offset.

64. The computer program product of claim 63, wherein the computer-readable medium further comprises code for causing the at least one computer to receive the negative offset from the access point.

65. A wireless device, comprising:
  a reselection indicator receiving component that receives a reselection indicator related to a restricted association access point in the wireless network that specifies whether intra-frequency reselection is allowed;
  an access point reselection component that evaluates disparate access points in a disparate frequency or technology for reselection from a current access point based at least in part on the reselection indicator; and
  an interference prediction component that estimates a level of interference to the restricted association access point resulting from communicating with the current access point, wherein the access point reselection component evaluates access points in the disparate frequency for reselection further based at least in part on the estimated level of interference, and wherein the reselection indicator is overridden where the estimated level of interference is below a threshold level.

66. The wireless device of claim 65, wherein the interference prediction component estimates the level of interference based at least in part on comparing a reference signal received power (RSRP) of the restricted association access point to that of the access point adding a negative offset.

67. The wireless device of claim 66, wherein the interference predication component receives the negative offset from the access point.

68. A method, comprising:
  providing one or more sectors selectable by one or more mobile devices for receiving access to a wireless network;
  generating a reselection indicator based at least in part on factoring previous interference from disparate mobile devices communicating with intra-frequency access points within the one or more sectors; and
  transmitting the reselection indicator to one or more mobile devices in the one or more sectors that specifies whether intra-frequency reselection is allowed for disparate access points in the one or more sectors.

69. The method of claim 68, further comprising transmitting a closed subscriber group (CSG) identifier to the one or more mobile devices in the one or more sectors to indicate restricted association.

70. The method of claim 68, wherein the reselection indicator relates to one or more restricted association access points located in the one or more sectors.

71. The method of claim 68, further comprising receiving a request for the reselection indicator.

72. The method of claim 68, further comprising receiving the reselection indicator from an underlying wireless network.

73. A wireless communications apparatus, comprising:
  at least one processor configured to:
    implement one or more sectors selectable by one or more mobile devices for receiving access to a wireless network;
    generate a reselection indicator based at least in part on factoring previous interference from disparate mobile devices communicating with intra-frequency access points within the one or more sectors; and
    provide the reselection indicator to one or more mobile devices in the one or more sectors that specifies whether intra-frequency reselection is allowed for disparate access points in the one or more sectors; and
  a memory coupled to the at least one processor.

74. The wireless communications apparatus of claim 73, wherein the at least one processor is further configured to provide a closed subscriber group (CSG) identifier to the one or more mobile devices in the one or more sectors to indicate restricted association.

75. The wireless communications apparatus of claim 73, wherein the reselection indicator relates to one or more restricted association access points located in the one or more sectors.

76. The wireless communications apparatus of claim 73, wherein the at least one processor is further configured to receive a request for the reselection indicator from the one or more mobile devices.

77. The wireless communications apparatus of claim 73, wherein the at least one processor is further configured to receive the reselection indicator from an underlying wireless network.

78. An apparatus, comprising:
  means for communicating with one or more mobile devices in a provided sector to provide access to a wireless network;
  means for generating a reselection indicator based at least in part on factoring previous interference from disparate mobile devices communicating with intra-frequency access points within the provided sector; and means for transmitting the reselection indicator to the one or more mobile devices that specifies whether intra-frequency reselection is allowed for disparate access points in the one or more sectors.

79. The apparatus of claim 78, further comprising means for providing a closed subscriber group (CSG) identifier to the one or more mobile devices in the provided sector to indicate restricted association.

80. The apparatus of claim 78, wherein the reselection indicator relates to one or more restricted association access points located in the provided sector.

81. The apparatus of claim 78, wherein the means for transmitting the reselection indicator receives a request for the reselection indicator from the one or more mobile devices.

82. The apparatus of claim 78, wherein the means for transmitting the reselection indicator receives the reselection indicator from an underlying wireless network.

83. A computer program product embodied on a non-transitory computer-readable medium comprising:
    code for causing at least one computer to provide one or more sectors selectable by one or more mobile devices for receiving access to a wireless network;
    code for causing the at least one computer to generate a reselection indicator based at least in part on factoring previous interference from disparate mobile devices communicating with intra-frequency access points within the one or more sectors; and
    code for causing the at least one computer to transmit the reselection indicator to one or more mobile devices in the one or more sectors that specifies whether intra-frequency reselection is allowed for disparate access points in the one or more sectors.

84. The computer program product of claim 83, wherein the computer-readable medium further comprises code for causing the at least one computer to transmit a closed subscriber group (CSG) identifier to the one or more mobile devices in the one or more sectors to indicate restricted association.

85. The computer program product of claim 83, wherein the reselection indicator relates to one or more restricted association access points located in the one or more sectors.

86. The computer program product of claim 83, wherein the computer-readable medium further comprises code for causing the at least one computer to receive a request for the reselection indicator.

87. The computer program product of claim 83, wherein the computer-readable medium further comprises code for causing the at least one computer to receive the reselection indicator from an underlying wireless network.

88. A wireless device, comprising:
    a transmitter for communicating with one or more mobile devices in a provided sector to provide access to a wireless network; and
    a reselection indicator component that provides a reselection indicator to the one or more mobile devices specifying whether intra-frequency reselection is allowed for disparate access points in the one or more sectors, wherein the reselection indicator component generates the reselection indicator based at least in part on factoring previous interference from disparate mobile devices communicating with intra-frequency access points within the provided sector.

89. The wireless device of claim 88, further comprising a restricted association component that provides a closed subscriber group (CSG) identifier to the one or more mobile devices in the provided sector to indicate restricted association.

90. The wireless device of claim 88, wherein the reselection indicator relates to one or more restricted association access points located in the provided sector.

91. The wireless device of claim 88, wherein the reselection indicator component receives a request for the reselection indicator from the one or more mobile devices.

92. The wireless device of claim 88, wherein the reselection indicator component receives the reselection indicator from an underlying wireless network.

93. A method, comprising:
    providing one or more sectors selectable by one or more mobile devices for receiving access to a wireless network; and
    transmitting an offset to a mobile device relating to overriding a reselection indicator received from a restricted association access point that specifies whether intra-frequency reselection is allowed, wherein the offset further relates to predicting interference caused to the restricted association access point by the mobile device communicating with a target access point that operates in a similar frequency region as the restricted association access point, and wherein the reselection indicator is overridden where a predicted level of interference resulting from the mobile device communicating with the target access point is below a threshold level.

94. The method of claim 93, further comprising providing wireless network access to the mobile device wherein the offset is a negative offset.

95. A wireless communications apparatus, comprising:
    at least one processor configured to:
        implement one or more sectors selectable by one or more mobile devices for receiving access to a wireless network; and
        provide an offset to a mobile device relating to overriding a reselection indicator received from a restricted association access point that specifies whether intra-frequency reselection is allowed, wherein the offset further relates to predicting interference caused to the restricted association access point by the mobile device communicating with a target access point that operates in a similar frequency region as the restricted association access point, and wherein the reselection indicator is overridden where a predicted level of interference resulting from the mobile device communicating with the target access point is below a threshold level; and
    a memory coupled to the at least one processor.

96. The wireless communications apparatus of claim 95, wherein the at least one processor is further configured to provide wireless network access to the mobile device wherein the offset is a negative offset.

97. An apparatus, comprising:
    means for communicating with one or more mobile devices in a wireless network; and
    means for transmitting an offset to a mobile device relating to overriding a reselection indicator received from a restricted association access point that specifies whether intra-frequency reselection is allowed, wherein the offset further relates to predicting interference caused to the restricted association access point by the mobile device communicating with a target access point that operates in a similar frequency region as the restricted association access point, and wherein the reselection indicator is overridden where a predicted level of interference resulting from the mobile device communicating with the target access point is below a threshold level.

98. The apparatus of claim 97, wherein the means for communicating provides wireless network access to the mobile device wherein the offset is a negative offset.

99. A computer program product embodied on a non-transitory computer-readable medium comprising:
   code for causing at least one computer to provide one or more sectors selectable by one or more mobile devices for receiving access to a wireless network; and
   code for causing at least one computer to transmit an offset to a mobile device relating to overriding a reselection indicator received from a restricted association access point that specifies whether intra-frequency reselection is allowed, wherein the offset further relates to predicting interference caused to the restricted association access point by the mobile device communicating with a target access point that operates in a similar frequency region as the restricted association access point, and wherein the reselection indicator is overridden where a predicted level of interference resulting from the mobile device communicating with the target access point is below a threshold level.

100. The computer program product of claim 99, wherein the computer-readable medium further comprises code for causing the at least one computer to provide wireless network access to the mobile device wherein the offset is a negative offset.

101. A wireless device, comprising:
   a transmitter for communicating with one or more mobile devices in a wireless network; and
   an interference offset component that transmits an offset to a mobile device relating to overriding a reselection indicator received from a restricted association access point that specifies whether intra-frequency reselection is allowed, wherein the offset further relates to predicting interference caused to the restricted association access point by the mobile device communicating with a target access point that operates in a similar frequency region as the restricted association access point, and wherein the reselection indicator is overridden where a predicted level of interference resulting from the mobile device communicating with the target access point is below a threshold level.

102. The wireless device of claim 101, wherein the wireless device provides wireless network access to the mobile device wherein the offset is a negative offset.

\* \* \* \* \*